(12) United States Patent
Morrison et al.

(10) Patent No.: US 9,133,284 B2
(45) Date of Patent: Sep. 15, 2015

(54) PASSIVATED SUPPORTS FOR USE WITH OLEFIN POLYMERIZATION CATALYSTS

(71) Applicant: NOVA Chemicals (International) S.A., Fribourg (CH)

(72) Inventors: Darryl J. Morrison, Calgary (CA); Charles Ashton Garret Carter, Calgary (CA); Amy Marie Baltimore, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 13/683,816

(22) Filed: Nov. 21, 2012

(65) Prior Publication Data
US 2013/0172500 A1 Jul. 4, 2013

(30) Foreign Application Priority Data
Dec. 5, 2011 (CA) .................................. 2760264

(51) Int. Cl.
*C08F 4/02* (2006.01)
*C08F 4/643* (2006.01)
*C08F 4/6592* (2006.01)
*C08F 210/16* (2006.01)
*C08F 4/659* (2006.01)

(52) U.S. Cl.
CPC .............. *C08F 4/65916* (2013.01); *C08F 4/022* (2013.01); *C08F 4/025* (2013.01); *C08F 210/16* (2013.01); *C08F 4/6592* (2013.01); *C08F 4/65912* (2013.01); *C08F 2410/01* (2013.01)

(58) Field of Classification Search
CPC ........ C08F 4/642; C08F 4/643; C08F 4/6592; C08F 4/022; C08F 4/025
USPC ................. 502/103, 115, 120, 132, 152, 162; 526/124.2, 129, 160, 161, 943
See application file for complete search history.

(56) References Cited

U.S. PATENT DOCUMENTS

| | | |
|---|---|---|
| 3,248,179 A | 4/1966 | Norwood |
| 4,127,507 A | 11/1978 | Fannin et al. |
| 4,250,288 A | 2/1981 | Lowery, Jr. et al. |
| 4,325,849 A | 4/1982 | Rosen et al. |
| 4,482,687 A | 11/1984 | Noshay et al. |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,701,432 A | 10/1987 | Welborn, Jr. |
| 4,798,081 A | 1/1989 | Hazlitt et al. |
| 4,808,561 A | 2/1989 | Welborn, Jr. |
| 4,935,397 A | 6/1990 | Chang |
| 4,937,301 A | 6/1990 | Chang |
| 5,026,795 A | 6/1991 | Hogan |
| 5,028,670 A | 7/1991 | Chinh et al. |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,206,075 A | 4/1993 | Hodgson, Jr. |
| 5,283,278 A | 2/1994 | Daire et al. |
| 5,317,036 A | 5/1994 | Brady, III et al. |
| 5,324,698 A | 6/1994 | Ala-Huikku et al. |
| 5,324,800 A | 6/1994 | Welborn, Jr. |
| 5,352,749 A | 10/1994 | DeChellis et al. |
| 5,376,439 A | 12/1994 | Hodgson et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,633,394 A | 5/1997 | Welborn, Jr. |
| 5,661,097 A | 8/1997 | Spencer et al. |
| 5,668,228 A | 9/1997 | Chinh et al. |
| 5,684,097 A | 11/1997 | Palmroos et al. |
| 5,703,187 A | 12/1997 | Timmers |
| 5,763,349 A | 6/1998 | Zandona |
| 5,798,314 A | 8/1998 | Spencer et al. |
| 5,965,677 A | 10/1999 | Stephan et al. |
| 6,002,033 A | 12/1999 | Razavi et al. |
| 6,022,935 A | 2/2000 | Fischer et al. |
| 6,031,056 A | 2/2000 | Friederichs et al. |
| 6,034,021 A | 3/2000 | Wilson et al. |
| 6,063,879 A | 5/2000 | Stephan et al. |
| 6,103,657 A | 8/2000 | Murray |

(Continued)

FOREIGN PATENT DOCUMENTS

| | | |
|---|---|---|
| CA | 2734167 A1 | 9/2012 |
| EP | 107127 A1 | 5/1984 |
| EP | 0110606 A1 | 6/1984 |
| EP | 811638 A2 | 12/1997 |
| EP | 1229055 A1 | 8/2002 |
| EP | 1764378 A1 | 3/2007 |
| WO | WO 93/03093 A1 | 2/1993 |
| WO | 2004013194 A2 | 2/2004 |

OTHER PUBLICATIONS

J. B. Peri and A. L. Hensley Jr., J. Phys. Chem., 72 (8), 1968, pp. 2926-2933.

(Continued)

*Primary Examiner* — Caixia Lu
(74) *Attorney, Agent, or Firm* — Julie L. Heinrich

(57) ABSTRACT

A phosphinimine catalyst immobilized on a passivated inorganic oxide support, had high activity at low co-catalyst concentrations and gave, under gas phase polymerization conditions, ethylene copolymer with a high molecular weight. A method of making a passivated silica support involves treatment of silica with an organoaluminum compound, a diorganomagnesium compound and a source of chloride (to make $MgCl_2$) under anhydrous conditions and in the absence of polar solvents.

13 Claims, 4 Drawing Sheets

(56) References Cited

U.S. PATENT DOCUMENTS

| | | |
|---|---|---|
| 6,114,479 A | 9/2000 | Speca et al. |
| 6,124,230 A | 9/2000 | Speca et al. |
| 6,140,432 A | 10/2000 | Agapiou et al. |
| 6,187,882 B1 | 2/2001 | Sensarma et al. |
| 6,214,948 B1 | 4/2001 | Zandona |
| 6,235,672 B1 | 5/2001 | McKay et al. |
| 6,271,325 B1 | 8/2001 | McConville et al. |
| 6,274,684 B1 | 8/2001 | Loveday et al. |
| 6,277,931 B1 | 8/2001 | Jaber et al. |
| 6,300,436 B1 | 10/2001 | Agapiou et al. |
| 6,300,438 B1 | 10/2001 | McConville |
| 6,300,439 B1 | 10/2001 | McConville |
| 6,303,719 B1 | 10/2001 | Murray et al. |
| 6,306,984 B1 | 10/2001 | Agapiou et al. |
| 6,309,997 B1 | 10/2001 | Fujita et al. |
| 6,320,002 B1 | 11/2001 | Murray et al. |
| 6,342,463 B1 | 1/2002 | Stephan et al. |
| 6,372,864 B1 | 4/2002 | Brown |
| 6,391,819 B1 | 5/2002 | Agapiou et al. |
| 6,399,724 B1 | 6/2002 | Matsui et al. |
| 6,417,304 B1 | 7/2002 | McConville et al. |
| 6,472,342 B2 | 10/2002 | Agapiou et al. |
| 6,489,413 B1 | 12/2002 | Floyd et al. |
| 6,562,924 B2 | 5/2003 | Benazouzz et al. |
| 6,583,083 B2 | 6/2003 | Murray et al. |
| 6,593,266 B1 | 7/2003 | Matsui et al. |
| 6,608,153 B2 | 8/2003 | Agapiou et al. |
| 6,642,325 B2 | 11/2003 | Luo et al. |
| 6,689,847 B2 | 2/2004 | Mawson et al. |
| 6,770,723 B2 | 8/2004 | Fujita et al. |
| 6,777,509 B2 | 8/2004 | Brown et al. |
| 6,984,695 B2 | 1/2006 | Brown et al. |
| 7,354,880 B2 | 4/2008 | Agapiou et al. |
| 7,402,546 B2 | 7/2008 | Klendworth et al. |
| 7,476,715 B2 | 1/2009 | McKay et al. |
| 2009/0163682 A1 | 6/2009 | Miranda et al. |

OTHER PUBLICATIONS

S. Brunauer, P.H. Emmett and E.Teller, Journal of the American Chemical Society, 1938, v 60, pp. 309-319

J. H. Clark and D. J. MacQuarrie, Supported Catalysts published online Nov. 15, 2002, Kirk-Othmer Encyclopedia of Chemical Technology, John Wiley & Sons, Inc., pp. 1-37.

Wild, Ryle, Knobeloch and Peat, determin. of branch. distribut. in polyethylene and ethylene copolymers, J. Poly. Sci., Poly. Phys. Ed. vol. 20, 1982, pp. 441-455.

Figure 2a  GPC-FTIR profile for polymerization run 29 with inventive catalyst 8

Figure 2b GPC-FTIR profile for polymerization run 30 with comparative catalyst 1

Figure 2c GPC-FTIR profile for polymerization run 31 with comparative catalyst 2

US 9,133,284 B2

PASSIVATED SUPPORTS FOR USE WITH OLEFIN POLYMERIZATION CATALYSTS

FIELD OF THE INVENTION

The present invention provides a passivated inorganic oxide support for use as a support for single site olefin polymerization catalysts. The passivated support is formed by adding an organoaluminum compound, and then magnesium chloride to, for example, silica. The magnesium chloride is generated in situ on the surface of the silica by adding a diorganomagnesium compound and a source of chloride. Non-donor and aprotic hydrocarbon solvents are used during the formation of the passivated support.

BACKGROUND OF THE INVENTION

The use of inorganic oxides such as silica or metal halides such as magnesium chloride as inert supports for olefin polymerization catalysts is well known in the art. Reports in which silica serves as an additional support for magnesium chloride based Zielger-Natta polymerization catalysts are also available (see for example U.S. Pat. Nos. 5,798,314, 5,661,097, and 6,642,325). However, the use of magnesium chloride treated silica supports for the immobilization of single site catalysts is relatively rare.

U.S. Pat. Appl. No. 2009/0163682 A1 discloses a supported "metallocene" catalyst which catalyzed slurry phase ethylene polymerization in the absence of traditional co-catalysts or activators such as methylaluminoxane. The "metallocene" catalyst has a single cyclopentadienyl type ligand and three halide ligands and is immobilized on a silica support which has been treated with an organoaluminum species and magnesium chloride. Preparation of the support employs magnesium chloride directly, and hence requires the use of a polar solvent for the solubilization of the magnesium chloride. The polyethylene products obtained had very high molecular weights and broad molecular weight distributions. Overall catalyst activities were fair and productivity reached more than 1000 gram of polymer per gram of supported catalyst. The use of a mono-cyclopentadienyl titanium trichloride species in the catalyst formulation may be more consistent with the formation of a traditional Ziegler-Natta multisite catalyst, as evidenced by the broad molecular weight distributions observed for the polymer products.

Indeed, a similar preparation reported in U.S. Pat. No. 5,324,698 employs a mono-cyclopentadienyl titanium trihalide catalyst to prepare a Ziegler-Natta catalyst on a silica support. That a multi-site catalyst was formed was supported by the high molecular weight distributions obtained for the product polymers (e.g. $M_w/M_n$ of 3.95 and higher) Again, magnesium chloride was used directly as a solution in tetrahydrofuran (along with mono-cyclopentadienyl titanium trichloride) for addition to a silica support.

U.S. Pat. No. 7,402,546 discloses a support for an olefin polymerization catalyst which comprises an inorganic oxide, such as silica, coated with magnesium chloride. Metallocenes, non-metallocene single site catalysts and Ziegler-Natta catalysts are contemplated for immobilization on the modified supports. Formation of the coated supports involved dissolving magnesium chloride in a polar solvent (e.g. ethanol), followed by addition to silica, resulting in magnesium chloride like particles having uniform and small particle size.

U.S. Pat. No. 6,187,882 describes the use of a mixed inorganic oxide/magnesium halide support for metallocene catalysts. The catalysts further comprise an electron donor compound such as tetrahydrofuran (THF) which is used to solubilize magnesium chloride during the catalyst preparation. The supported catalyst formulations do not comprise a cocatalyst such as MAO, which is added instead, directly to the polymerization reactor. The metallocenes employed in the examples are bis-cyclopentadienyl or bis-indenyl catalysts based on zirconium.

The above prior arts employ a strategy in which pre-made magnesium chloride is solubilized in a polar solvent prior to addition to an inorganic oxide support. Polar solvents can have deleterious effects on single site polymerization catalyst performance due to their tendency to coordinate to the active polymerization metal center.

U.S. Pat. Nos. 5,763,349 and 6,214,948 both teach the use of a silica-magnesium chloride mixed support for a metallocene catalyst. The support is formed by tumbling dry silica powder with anhydrous magnesium chloride powder. A metallocene catalyst is added to the support in powder form and in the absence of a liquid. The catalyst formulation is completed by adding a solution of an ionic activator such as triphenylcarbenium tetrakispentafluorophenylborate. Tumbling a dry magnesium chloride powder with a silica powder limits contact between the two substrates and may not be an efficient way to ensure an even distribution of a magnesium chloride within the silica pores.

The present invention overcomes the limitations of the prior art by providing a passivated inorganic oxide support by treatment with magnesium chloride that is generated in situ.

SUMMARY OF THE INVENTION

The present invention provides an anhydrous (and polar solvent free) method for making inorganic oxide supports which are passivated by treatment with an organoaluminum compound and a magnesium halide. Single site polymerization catalysts, co-immobilized on the passivated support with an activator, give polyethylene copolymers with uniform comonomer distribution, high molecular weight and narrow molecular weight distribution.

The passivated support is formed by treating a dehydrated silica with an organoaluminum compound, followed by treatment with a diorganomagnesium compound and then a source of halide to deposit in situ generated magnesium halide (e.g. $MgCl_2$) onto the silica (mostly within the pores). Since the organoaluminum and diorganomagnesium compound are soluble (or can made soluble) in hydrocarbons, polar or donor solvents can be avoided.

The passivated support of the present invention is made in the absence of water, and in the absence of protic, polar or donor solvents, solvents which can be difficult to remove and which can adversely affect polymerization catalyst performance.

Provided is an olefin polymerization catalyst comprising: a passivated support, a group 4 single site catalyst and a cocatalyst, the passivated support comprising silica which has been treated with i) an organoaluminum compound and ii) magnesium chloride, wherein the magnesium chloride is generated by addition of a diorganomagnesium compound and a source of chloride to the organoaluminum treated silica, provided that the source of chloride is not a transition metal chloride.

Provided is an olefin polymerization catalyst comprising: a passivated support, a group 4 single site catalyst and a cocatalyst, the passivated support comprising silica which has been treated with i) an organoaluminum compound and ii) magnesium chloride, wherein the magnesium chloride is generated by addition of a diorganomagnesium compound and a source of chloride to the organoaluminum treated silica, provided that the source of chloride is not a transition metal chloride and wherein said passivated support is prepared in a nonpolar hydrocarbon solvent or diluent.

Provided is a method of making an olefin polymerization catalyst, said method comprising:
  a) making a passivated support by carrying out the following steps: i) dehydrating silica; ii) adding an organoaluminum compound to the dehydrated silica; iii) adding a diorganomagnesium compound to the product of step ii); and iv) adding a source of chloride to the product of step iii), provided that the source of chloride is not a transition metal chloride; and
  b) adding to the passivated support, a group 4 single site catalyst and a cocatalyst in any order.

Provided is an olefin polymerization process comprising contacting ethylene and at least one alpha-olefin with a polymerization catalyst, said polymerizing catalyst comprising: a passivated support, a group 4 single site catalyst and a cocatalyst; wherein the passivated support comprises silica which has been treated with i) an organoaluminum compound and ii) magnesium chloride, wherein the magnesium chloride is generated by addition of a diorganomagnesium compound and a source of chloride to the organoaluminum treated silica, provided that the source of chloride is not a transition metal chloride.

In an embodiment of the invention, the olefin polymerization process is a gas phase process.

In an embodiment of the invention the single site catalyst is a group 4 phosphinimine single site catalyst.

In an embodiment of the invention the cocatalyst is an alkylaluminoxane.

In an embodiment of the invention, treatment of the passivated support with a phosphinimine catalyst and a cocatalyst gives an active polymerization catalyst in supported form.

In an embodiment of the invention, use of the passivated support allows for a reduction in the amount of co-catalyst required for catalyst activation while not significantly impacting the catalyst productivity.

In an embodiment of the invention, use of the passivated support gives rise to a catalyst which has a decreased sensitivity to hydrogen, which is advantageous for gas phase polymerization process control.

In an embodiment of the invention, use of the passivated support gives rise to a catalyst which has increased productivity.

In an embodiment of the invention, the current invention provides a polyethylene comprising at least 75 wt % of ethylene units with the balance being alpha-olefin units, said polyethylene having a CDBI of greater than 55%, and said polyethylene being made with a catalyst system comprising: a passivated support, a phosphinimine catalyst and a cocatalyst; wherein the passivated support comprises silica which has been treated with i) an organoaluminum compound and ii) magnesium chloride, wherein the magnesium chloride is generated by addition of a diorganomagnesium compound and a source of chloride to the organoaluminum treated silica, provided that the source of chloride is not a transition metal chloride.

In an embodiment of the invention, the current invention provides a polyethylene comprising at least 75 wt % of ethylene units with the balance being alpha-olefin units, said polyethylene having a CDBI of greater than 55%, and said polyethylene being made with a catalyst system comprising: a passivated support, a phosphinimine catalyst and a cocatalyst; wherein the passivated support comprises silica which has been treated with i) an organoaluminum compound and ii) magnesium chloride, wherein the magnesium chloride is generated by addition of a diorganomagnesium compound and a source of chloride to the organoaluminum treated silica, provided that the source of chloride is not a transition metal chloride; and wherein the phosphinimine catalyst has the formula: $(1,2-(R^2)(Ar-F)Cp)Ti(N=P(t-Bu)_3)X_2$ where $R^2$ is a hydrocarbon group, Ar—F is a perfluorinated aryl group, a 2,6 fluoro substituted phenyl group, a 2,4,6 fluoro substituted phenyl, or a 2,3,5,6 fluoro substituted phenyl group, and X is an activatable ligand; and wherein the cocatalyst is an alkylaluminoxane.

DETAILED DESCRIPTION OF PREFERRED EMBODIMENTS

Figure 1:
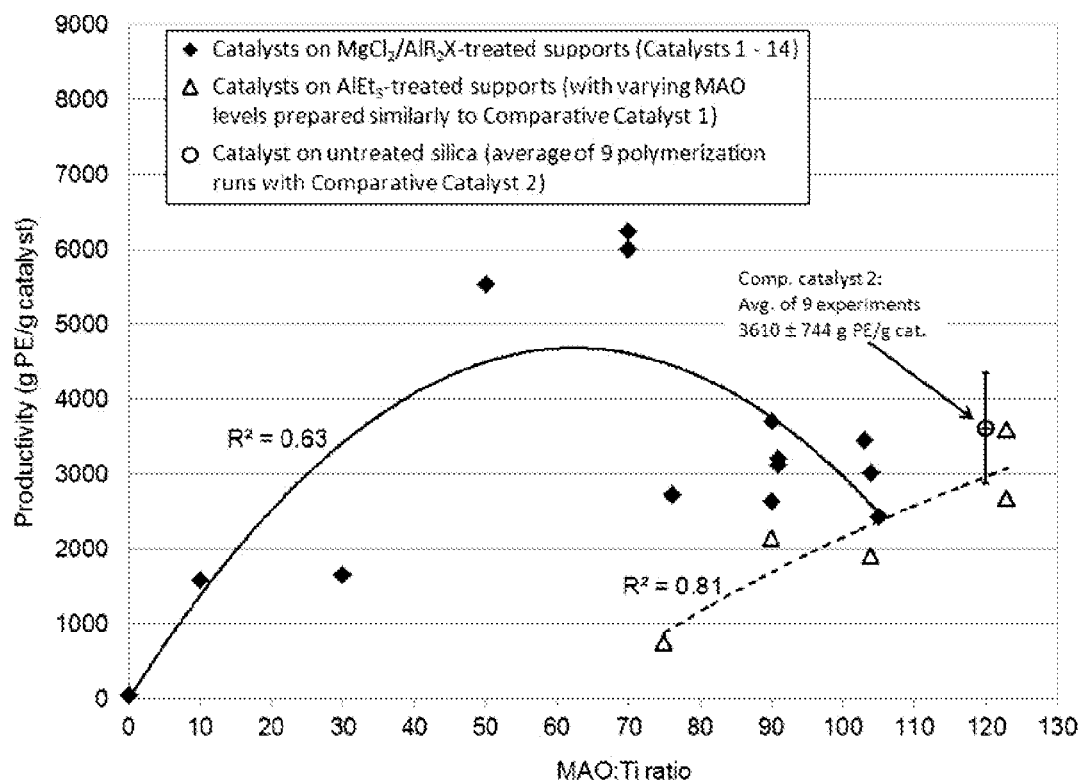
FIG. 1 shows the relationship between the molar ratio of the methylaluminoxane cocatalyst to the single site transition metal and catalyst productivity. The black diamonds represent the productivity of inventive catalysts compositions having different MAO/Ti molar ratios; the open circle and open triangles represent the productivity of comparative catalyst compositions having different MAO/Ti molar ratios.

The present invention is directed to a method for making a passivated inorganic oxide support, and to catalysts, processes and products which arise when employing such a support.

In the present invention, the term "polar solvent" or "donor solvent" is meant to connote a solvent having one or more heteroatoms with available electron density. Heteroatoms may be selected from for example, O, N, S, P atoms. Exemplary polar or donor solvents include for example, water, alcohols and tetrahydrofuran (THF).

In the present invention, the term "protic solvent" connotes a solvent having reactive or dissociable $H^+$ (proton). Exemplary protic solvents include, for example, water, alcohols and amines which have a hydrogen bound to an oxygen or a nitrogen atom. The term "aprotic solvent" then means a solvent not having a dissociable or reaction $H^+$ (proton).

In the present invention, an olefin polymerization catalyst will comprise a passivated support, a single site catalyst, preferably a group 4 based single site catalyst, and a cocatalyst.

The Passivated Support

The passivated support is based on an inorganic oxide material.

Inorganic oxides include Group 2, 3, 4, 5, 13 and 14 metal oxides generally, silica, alumina, silica-alumina, magnesium oxide, zirconia, titania, clay (e.g. montmorillonite) and mixtures thereof. Agglomerate supports such as agglomerates of silica and clay may also be used as a support in the current invention. Silica is preferred for use as the inorganic oxide.

Supports are generally used in calcined form. An inorganic oxide support, for example silica, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the invention, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

A support material, such as silica, typically has a surface area of from about 10 to about 700 m$^2$/g, a pore volume in the range from about 0.1 to about 4.0 cc/g and an average particle size of from about 5 to about 500 μm. In a specific embodiment, the support material has a surface area of from about 50 to about 500 m$^2$/g, a pore volume in the range from about 0.5 to about 3.5 cc/g and an average particle size of from about 10 to about 200 μm. In another specific embodiment the support material has a surface area of from about 100 to about 400 m$^2$/g, a pore volume in the range from about 0.8 to about 3.0 cc/g and an average particle size of from about 5 to about 100 μm.

A support material, such as silica, typically has an average pore size (i.e. pore diameter) of from about 10 to about 1000 Angstroms (Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pg 309-319.

A silica support which is suitable for use in the present invention has a high surface area and is amorphous. By way of example, useful silicas are commercially available under the trademark of Sylopol® 958, 955 and 2408 from Davison Catalysts, a Division of W. R. Grace and Company and ES-70W by PQ Corporation.

A "passivated support" in the present invention is an inorganic oxide which has been treated with an organoaluminum compound and magnesium halide.

To make a passivated support, the inorganic oxide is treated first with an organoaluminum compound and next with a magnesium halide, preferably magnesium chloride (MgCl$_2$). In the present invention, the magnesium halide must be generated in situ by combining a diorganomagnesium compound with a source of halide. Generation of magnesium chloride in situ makes the use of polar or donor solvents, usually required to dissolve MgCl$_2$, unnecessary. Without wishing to be bound by theory, the result of such treatments is a passivated inorganic oxide support which has on its surface, and mainly distributed within its pores, a magnesium halide compound, network or matrix. Although not preferred, the use of a Grignard reagent in place of a diorganomagnesium reagent is also contemplated by the invention, so long as the Grignard reagent selected is at least partially soluble in a hydrocarbon solvent lacking donor or polar groups.

In an embodiment of the invention the passivated support is formed by carrying out the following steps in sequence:
i) dehydrating an inorganic oxide under calcinations conditions;
ii) treating the calcined inorganic oxide with an organoaluminum compound;
iii) reacting the product of step ii) with a diorganomagnesium compound; and
iv) adding a source of halide (e.g. chloride) to the product of step iii).

In an embodiment of the invention the passivated support is formed by carrying out the following steps in sequence:
i) dehydrating an inorganic oxide under calcinations conditions;
ii) treating the calcined inorganic oxide with an organoaluminum compound;
iii) adding a source of halide (e.g. chloride) to the product of step ii); and
iv) reacting the product of step iii) with a diorganomagnesium compound.

The organoaluminum compound added to the inorganic oxide may be selected from organoaluminum compounds having the formula:

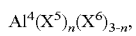

$$Al^4(X^5)_n(X^6)_{3-n},$$

where (X$^5$) is a hydrocarbyl having from 1 to about 20 carbon atoms; (X$^6$) is selected from alkoxide or aryloxide, any one of which having from 1 to about 20 carbon atoms; halide; or hydride; and n is a number from 1 to 3, inclusive. The organoaluminum compound may also be a di- or multi aluminum species bridged by a heteroatom, preferably an oxygen atom. Although not preferred, the use of an alkylaluminoxane reagent as the organoaluminum compound is also contemplated by the current invention.

Some non-limiting examples of organoaluminum compounds which can be used in the present invention include but are not limited to trimethylaluminum, triisobutylaluminum, triethylaluminum, tri-n-hexylaluminum, tri-n-octylaluminum, dimethylaluminum chloride, methyl aluminum dichloride, diethylaluminum chloride, ethylaluminum dichloride, diethylaluminum ethoxide, and bis(di-isobutylaluminum)oxide.

The amount of organoaluminum compound added to an inorganic oxide (e.g. calcined silica) will depend on a number of factors such as but not limited to the type of inorganic oxide and the calcination conditions used prior to treatment. By way of example, the amount of organoaluminum compound added to a calcined inorganic oxide can be from about 0.025 mmol to about 4.0 mmol per gram of inorganic oxide. In further embodiments of the invention, the amount of organoaluminum compound added to a calcined inorganic oxide will be from about 0.025 mmol to about 3.5 mmol per gram of inorganic oxide, or from about 0.05 mmol to about 4.0 mmol per gram of inorganic oxide, or from about 0.05 mmol to about 3.0 mmol per gram of inorganic oxide, or from about 0.05 mmol to about 2.5 mmol per gram of inorganic oxide, or from about 0.1 mmol to about 4.0 mmol per gram of inorganic oxide, or from about 0.1 mmol to about 3.5 mmol per gram of inorganic oxide, or from about 0.1 mmol to about 3.0 mmol per gram of inorganic oxide, or from about 0.1 mmol to about 2.5 mmol per gram of inorganic oxide, or from about 0.25 mmol to about 3.0 mmol per gram of inorganic oxide, or from about 0.25 mmol to about 2.5 mmol per gram of inorganic oxide.

In the present invention, preferably an organoaluminum compound will be added to a support in the absence of relatively polar solvents or solvents having a donor atom. Hence, suitable diluent(s) or solvent(s) are typically inert hydrocarbons. Suitable, non-limiting diluents or solvents may be selected from the following inert hydrocarbons: n-butane, n-pentane, isopentane, n-hexane, various isomeric hexanes, heptane, n-octane, isooctane, paraffinic mixtures of alkanes having from 8 to 12 carbon atoms, cyclohexane, methylcyclohexane, dimethylcyclohexane, dodecane, industrial solvents composed of saturated or aromatic hydrocarbons such as kerosene, naphthas, benzene, toluene and the like, and mixtures thereof.

The diorganomagnesium compound may be a dihydrocarbylmagnesium such as dialkylmagnesium or diarylmagnesium. Dialkylmagnesium compounds are preferred. In an embodiment of the invention, a diorganomagnesium compound has the general formula MgRaRb where Ra and Rb are each independently selected from $C_1$ to $C_{20}$ hydrocarbyl groups. In another embodiment of the invention, a diorganomagnesium compound has the general formula MgRaRb where Ra and Rb are each independently selected from $C_1$ to $C_8$ hydrocarbyl groups.

Suitable non-limiting examples of dialkylmagnesium compounds include dibutylmagnesium, diisopropylmagnesium, dihexylmagnesium, diethylmagnesium, propylbutylmagnesium, butylethylmagnesium, butyloctylmagnesium and other compounds having the general formula MgRaRb where Ra and Rb are each independently selected from $C_1$ to $C_8$ linear or branched alkyl groups.

Diarylmagnesium compounds include for example diphenylmagnesium, and ditolylmagnesium.

Diorganomagnesium compounds having alkylaryl groups are also contemplated for use with the current invention and include for example dibenzylmagnesium.

In cases where the diorganomagnesium compound is not readily soluble in the solvents or diluents of choice for the passivated support preparation, it may be desirable to add a solubilizing compound such as an organoaluminum or organozinc compound prior to use. Such compounds are discussed in, for example, U.S. Pat. Nos. 4,127,507 and 4,250,288. Alternatively, where diorganomagnesium compounds provide solutions which are overly viscous in diluents of choice, solubilizers such as organoaluminum or organozinc may be used to decrease the viscosity of the solution.

The diorganomagnesium compounds used in the present invention may be treated with a solubilizing agent (or viscosity improving agent) and may be formulated as solutions in a suitable hydrocarbon solvent. Such solutions are commercially available from suppliers such as Albermarle, Akzo Nobel, etc. For example, diorganomagnesium compounds available in hydrocarbon solution include solutions of butylethylmagnesium or dibutylmagnesium which have been treated with an organoaluminum compound to improve solubility and/or reduce solution viscosity.

In the present invention, preferably, the diorganomagnesium compounds will be added to a support in the absence of relatively polar solvents or solvents having a donor atom. Hence, suitable diluent(s) or solvent(s) are typically inert hydrocarbons. Suitable, non-limiting diluents or solvents may be selected from the following inert hydrocarbons: n-butane, n-pentane, isopentane, n-hexane, various isomeric hexanes, heptane, n-octane, isooctane, paraffinic mixtures of alkanes having from 8 to 12 carbon atoms, cyclohexane, methylcyclohexane, dimethylcyclohexane, dodecane, industrial solvents composed of saturated or aromatic hydrocarbons such as kerosene, naphthas, benzene, toluene and the like, and mixtures thereof.

By way of example, the amount diorganomagnesium compound added to an inorganic oxide can be from 0.025 mmol to 5 mmol per gram of inorganic oxide. In further embodiments of the invention, the amount diorganomagnesium compound added to an inorganic oxide can be from 0.025 mmol to 3.5 mmol per gram of inorganic oxide, or from 0.05 to 3.5 mmol per gram of inorganic oxide, or from 0.1 to 3.5 mmol per gram of inorganic oxide, or from 0.25 to 3.5 mmol per gram of inorganic oxide, or from 0.5 to 3.5 mmol per gram of inorganic oxide, or from 0.5 to 3.0 mmol per gram of inorganic oxide, or from 0.5 to 2.5 mmol per gram of inorganic oxide.

The source of halide (e.g. chloride) ion is not specifically defined and can be any suitable halide source compound, which is capable of providing an active (i.e. reactive) halide, preferably, chloride ion for reaction with a diorganomagnesium bond. Preferably the halide source will react spontaneously and fully with the diorganomagnesium compound, but a halide source, such as chloride source, which requires a transfer agent such as described in U.S. Pat. No. 6,031,056 is also contemplated for use with the current invention.

In a preferred embodiment of the invention, the source of halide will be a non-transition metal source of halide, preferably a non-transition metal chloride compound. Convenient chloride sources include, for example, HCl or tert-butyl chloride.

In an embodiment of the invention, the source of halide will be an organic halide compound such as, for example, an alkyl chloride having the formula (Rc)Cl, wherein Rc is a $C_1$ to $C_8$ alkyl group.

In the present invention, preferably the source of halide (e.g. chloride) will be added to a support in the absence of relatively polar solvents or solvents having a donor atom. Hence, suitable diluent(s) or solvent(s) are typically inert hydrocarbons. Suitable, non-limiting diluents or solvents may be selected from the following inert hydrocarbons: n-butane, n-pentane, isopentane, n-hexane, various isomeric hexanes, heptane, n-octane, isooctane, paraffinic mixtures of alkanes having from 8 to 12 carbon atoms, cyclohexane, methylcyclohexane, dimethylcyclohexane, dodecane, industrial solvents composed of saturated or aromatic hydrocarbons such as kerosene, naphthas, benzene, toluene and the like, and mixtures thereof.

The amount of the source of halide which is added to the inorganic oxide should be sufficient to convert a majority of the diorganomagnesium compound into magnesium halide. For example, the molar ratio of halide in the source of halide to a diorganomagnesium compound MgRaRb should be at least 1.5. In another embodiment, the molar ratio of halide in the source of halide to the diorganomagnesium compound is at least 1.75. In another embodiment, the molar ratio of halide in the source of halide to the diorganomagnesium compound is at least 1.85. In another embodiment, the molar ratio of halide in the source of halide to the diorganomagnesium compound is at least 1.95.

In embodiments of the invention the molar ratio of chloride in a source of chloride to a diorganomagnesium compound MgRaRb is from 1.5 to 3.0, or from 1.75 to 2.75, or from 1.85 to 2.5, or from 2.0 to 3.0, or from 2.0 to 2.5, or from 1.95 to 2.5, or from 1.95 to 2.25.

In an embodiment of the invention, the finished olefin polymerization catalyst comprising a passivated support, a single site catalyst and a co-catalyst can have from about 1 to about 20 weight percent (wt %) of magnesium chloride present based on the total weight of the catalyst. In an embodiment of the invention, the finished olefin polymerization catalyst comprising a passivated support, a single site catalyst and a co-catalyst can have from about 1 to about 15 weight percent (wt %) of magnesium chloride present based on the total weight of the catalyst. In an embodiment of the invention, the finished olefin polymerization catalyst comprising a passivated support, a single site catalyst and a co-catalyst can have from about 3 to about 15 weight percent (wt %) of magnesium chloride present based on the total weight of the catalyst. In an embodiment of the invention, the finished olefin polymerization catalyst comprising a passivated support, a single site catalyst and a co-catalyst can have from about 3 to about 13 weight percent (wt %) of magnesium chloride present based on the total weight of the catalyst.

The Single Site Catalyst

Suitable single site catalysts include metallocene catalysts (which have two cyclopentadienyl type ligands), constrained geometry catalysts (which have an amido type ligand and a cyclopentadienyl type ligand), and phosphinimine catalysts (which have a phosphinimine ligand) all of which are well known to persons skilled in the relevant art.

Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference.

Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety.

Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Other single site catalysts known in the art may also be used in the present invention (e.g. catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657).

Preferably, the single site catalyst is based on a group 3, 4 or 5 metal (where the numbers refer to columns in the Periodic Table of the Elements using IUPAC nomenclature). Most typically, single site catalysts are based on metals from group 4, which includes titanium, hafnium and zirconium. The most preferred single site catalysts are group 4 metal complexes in their highest oxidation state.

Polymerization catalysts, such as the single site catalysts described herein, usually require activation by one or more cocatalytic or activator species in order to provide polymer. Hence, polymerization catalysts are sometimes called "precatalysts".

Particularly suitable for the current invention, are phosphinimine catalysts which are further described below.

The Phosphinimine Catalyst

Preferably, the phosphinimine catalyst is based on metals from group 4, which includes titanium, hafnium and zirconium. The most preferred phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

In an embodiment of the invention, a phosphinimine catalyst is defined by the formula: $(L)_n(PI)_mMX_p$ where M is a transition metal selected from Ti, Hf, Zr; PI is a phosphinimine ligand; L is a cyclopentadienyl type ligand; X is an activatable ligand; m is 1 or 2; n is 0 or 1; and p is determined by the valency of the metal M. Preferably m is 1, n is 1 and p is 2.

In an embodiment of the invention, a phosphinimine catalyst is defined by the formula: $(L)(PI)MX_2$ where M is a transition metal selected from Ti, Hf, Zr; PI is a phosphinimine ligand; L is a cyclopentadienyl type ligand; and X is an activatable ligand.

The phosphinimine ligand is defined by the formula: $R_3P=N-$, where N bonds to the metal, and wherein each R is independently selected from the group consisting of a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $-SiR'_3$ wherein each R' is independently selected from the group consisting of hydrogen, a $C_{1-8}$ alkyl or alkoxy radical, $C_{6-10}$ aryl or aryloxy radicals; and germanyl radical of the formula: $-GeR'_3$ wherein R' is as defined above.

In an embodiment of the invention the phosphinimine ligand is chosen so that each R is a hydrocarbyl radical. In a particular embodiment of the invention, the phosphinimine ligand is tri-(tertiarybutyl)phosphinimine (i.e. where each R is a tertiary butyl group).

In an embodiment of the invention, the phosphinimine catalyst is a group 4 compound/complex which contains one phosphinimine ligand (as described above) and one ligand L which is a cyclopentadienyl-type ligand.

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions or indenyl and fluorenyl ligands are also contemplated for use in the current invention, so long as the five carbon ring which bonds to the metal via eta-5 bonding remains intact. An exemplary list of substituents for a cyclopentadienyl ligand, an indenyl ligand (or hydrogenated version thereof) and a fluorenyl ligand (or hydrogenated version thereof) includes the group consisting of $C_{1-10}$ hydrocarbyl radical (which hydrocarbyl substituents are unsubstituted or further substituted by for example a halide and/or a hydrocarbyl group); a halogen atom; $C_{1-8}$ alkoxy radical; a $C_{1-10}$ aryl or aryloxy radical (each of which may be further substituted by for example a halide and/or a hydrocarbyl group; for example a suitable substituted $C_{1-10}$ group is a perfluoroaryl group such as $-C_6F_5$); an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $-Si(R')_3$ wherein each R' is independently selected from the group consisting of hydrogen, a $C_{1-8}$ alkyl or alkoxy radical, $C_{6-10}$ aryl or aryloxy radicals; and germanyl radicals of the formula $-Ge(R')_3$ wherein R' is as defined directly above.

The term "activatable ligand" refers to a ligand which may be activated by a cocatalyst (also referred to as an "activator"), to facilitate olefin polymerization. Examples of activatable ligands X, are independently selected from the group consisting of a hydrogen atom; a halogen atom; a $C_{1-10}$ hydrocarbyl radical; a $C_{1-10}$ alkoxy radical; a $C_{5-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable X ligands may also be joined to one another and form for example, a substituted or unsubstituted diene ligand (i.e. 1,3-diene); or a delocalized heteroatom containing group such as an acetate group.

The number of activatable ligands depends upon the valency of the metal and the valency of the activatable ligand. The preferred phosphinimine catalysts are based on group 4 metals in their highest oxidation state (i.e. 4$^+$). Particularly suitable activatable ligands are monoanionic such as a halide (e.g. chloride) or a hydrocarbyl (e.g. methyl, benzyl).

In some instances, the metal of the phosphinimine catalyst may not be in the highest oxidation state. For example, a titanium (III) component would contain only one activatable ligand.

In an embodiment of the invention, the phosphinimine catalyst has the formula, (L)(PI)MX$_2$, where M is Ti, Zr or Hf; PI is a phosphinimine ligand having the formula R$_3$P=N—, where R is independently selected from the group consisting of hydrogen, halogen, and $C_1$-$C_{20}$ hydrocarbyl; L is a ligand selected from the group consisting of cyclopentadienyl, substituted cyclopentadienyl, indenyl, substituted indenyl, fluorenyl, and substituted fluorenyl; and X is an activatable ligand.

In an embodiment of the invention, the phosphinimine catalyst contains a phosphinimine ligand, a cyclopentadienyl ligand and two chloride or two methyl ligands bonded to the group 4 metal.

In an embodiment of the invention, the phosphinimine catalyst contains a phosphinimine ligand, a substituted cyclopentadienyl ligand and two chloride or two methyl ligands bonded to the group 4 metal.

In an embodiment of the invention, the phosphinimine catalyst contains a phosphinimine ligand, a perfluoroaryl substituted cyclopentadienyl ligand and two chloride or two methyl ligands bonded to the group 4 metal.

In an embodiment of the invention, the phosphinimine catalyst contains a phosphinimine ligand, a perfluorophenyl substituted cyclopentadienyl ligand (i.e. Cp—$C_6F_5$) and two chloride or two methyl ligands bonded to the group 4 metal.

In an embodiment of the invention, the phosphinimine catalyst contains a 1,2-substituted cyclopentadienyl ligand and a phosphinimine ligand which is substituted by three tertiary butyl substituents.

In an embodiment of the invention, the phosphinimine catalyst contains a 1,2 substituted cyclopentadienyl ligand (e.g. a 1,2-(R*)(Ar—F)Cp) where the substituents are selected from R* a hydrocarbyl group, and Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group respectively.

In the present invention, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current invention contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the invention, the phosphinimine catalyst has the formula: (1,2-(R*)(Ar—F)Cp)M(N=P(t-Bu)$_3$)X$_2$ where R* is a hydrocarbyl group; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(R*)(Ar—F)Cp)M(N=P(t-Bu)$_3$)X$_2$ where R* is an alkyl group; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(R*)(Ar—F)Cp)M(N=P(t-Bu)$_3$)X$_2$ where R* is a hydrocarbyl group having from 1 to 20 carbons; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(R*)(Ar—F)Cp)M(N=P(t-Bu)$_3$)X$_2$ where R* is a hydrocarbyl group having from 1 to 20 carbons; Ar—F is a perfluorinated aryl group; M is Ti, Zr or Hf; and X is an activatable ligand. In an embodiment of the invention, the phosphinimine catalyst has the formula: (1,2-(n-R*)(Ar—F)Cp)M(N=P(t-Bu)$_3$)X$_2$ where R* is a straight chain alkyl group; Ar—F is a perfluorinated aryl group; M is Ti, Zr or Hf; and X is an activatable ligand. In an embodiment of the invention, the phosphinimine catalyst has the formula: (1,2-(R*)($C_6F_5$)Cp)M(N=P(t-Bu)$_3$)X$_2$ where R* is a hydrocarbyl group having 1 to 20 carbon atoms; M is Ti, Zr or Hf; and X is an activatable ligand. In an embodiment of the invention, the phosphinimine catalyst has the formula: (1,2-(n-R*)($C_6F_5$)Cp)M(N=P(t-Bu)$_3$)X$_2$ where R* is a straight chain alkyl group; M is Ti, Zr or Hf; and X is an activatable ligand. In further embodiments, M is Ti and R* is selected from the group consisting of n-propyl, n-butyl and n-hexyl, and X is selected from chloride or methide.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$). In embodiments of the invention, Ar—F is selected from the group comprising perfluorinated phenyl or perfluorinated naphthyl groups.

Some phosphinimine catalysts which may be used in the present invention include: (($C_6F_5$)Cp)Ti(N=P(t-Bu)$_3$)Cl$_2$; (1,2-(n-propyl)($C_6F_5$)Cp)Ti(N=P(t-Bu)$_3$)Cl$_2$, (1,2-(n-butyl)($C_6F_5$)Cp)Ti(N=P(t-Bu)$_3$)Cl$_2$ and (1,2-(n-hexyl)($C_6F_5$)Cp)Ti(N=P(t-Bu)$_3$)Cl$_2$ The Cocatalyst In the present invention, the single site catalyst is used in combination with at least one activator (or "cocatalyst") to form an active polymerization catalyst system for olefin polymerization. Activators (i.e. cocatalysts) include ionic activator cocatalysts and hydrocarbyl aluminoxane (e.g. alkylaluminoxanes) cocatalysts.

The activator used to activate the single site catalyst can be any suitable activator including one or more activators selected from the group consisting of alkylaluminoxanes and ionic activators, optionally together with an alkylating agent.

The alkylaluminoxanes are complex aluminum compounds of the formula: $R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

The alkylaluminoxanes are typically used in substantial molar excess compared to the amount of group 4 transition metal in the single site catalyst. The $Al^1$:group 4 transition metal molar ratios are from 10:1 to 500:1, or from about 30:1 to about 250:1.

In embodiments of the present invention the molar ratio of $Al^1$:group 4 transition metal of a phosphinimine catalyst is less than 120:1, or less than 110:1, or less than 100:1, or less than 90:1, or less than 80:1, or less than 70:1, or less than 60:1, or less than 50:1, or less than 40:1, or less than 30:1, or less than 20:1, but is always at least 5:1, or at least 10:1.

In embodiments of the present invention the molar ratio of $Al^1$:group 4 transition metal of a phosphinimine catalyst is from 10:1 to 120:1, and including narrower ranges within this range, such as for example, from 20:1 to 120:1, or from 30:1 to 120:1, or from 10:1 to 110:1, or from 10:1 to 100:1, or from 10:1 to 90:1, or from 20:1 to 100:1, or from 30:1 to 100:1, or from 40:1 to 120:1, or from 40:1 to 100:1, or from 50:1 to 120:1, or from 50:1 to 100:1, or from 70:1 to 120:1, or from 70:1 to 110:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present invention may be a combination of an alkylating agent (which may also serve as a scavenger) with an activator capable of ionizing the group 4 metal of the single site catalyst (i.e. an ionic activator). In this context, the activator can be chosen from one or more alkylaluminoxane and/or an ionic activator.

When present, the alkylating agent may be selected from the group consisting of $(R^4)_p MgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_q ZnX^2_{2-q}$ wherein $R^4$ is as defined above, $X^2$ is halogen and q is 1 or 2; $(R^4)_s Al^2 X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium $((Bu)_2Mg)$, and butyl ethyl magnesium (BuEtMg or BuMgEt).

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$ alkyl radical; and (ii) compounds of the formula $[(R^8)_t ZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. $PhR^8_2NH^+$, which is substituted by two $R^8$ radicals such as for example two $C_{1-4}$ alkyl radicals).

Examples of compounds capable of ionizing the phosphinimine catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyltrispentafluorophenyl borate, benzene (diazonium) phenyltrispentafluorophenyl borate, tropillium tetrakis(2,3,5, 6-tetrafluorophenyl)borate, triphenylmethylium tetrakis(2,3, 5,6-tetrafluorophenyl)borate, benzene (diazonium)tetrakis (3,4,5-trifluorophenyl)borate, tropillium tetrakis(3,4,5-trifluorophenyl)borate, benzene (diazonium)tetrakis(3,4,5-trifluorophenyl)borate, tropillium tetrakis(1,2,2-trifluoroethenyl)borate, trophenylmethylium tetrakis(1,2,2-trifluoroethenyl)borate, benzene (diazonium)tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, and benzene(diazonium)tetrakis (2,3,4,5-tetrafluorophenyl)borate.

Commercially available activators which are capable of ionizing the group 4 metal of the single site catalyst include: N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and trispentafluorophenyl boron.

The ionic activator compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

Addition of the Single Site Catalyst and Cocatalyst to the Passivated Support

The present invention is not limited to any particular procedure for supporting the single site catalyst or the cocatalyst. Processes for depositing a single site catalyst complex and/or a cocatalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support a single site catalyst see U.S. Pat. No. 5,965,677). For example, the single site catalyst may be added to the passivated support by co-precipitation with the support material. The cocatalyst can be added to the passivated support before and/or after the single site catalyst or together with the single site catalyst (e.g. a phosphinimine catalyst may be mixed with a cocatalyst in a suitable solvent or diluents and the mixture added to the passivated support). Optionally, the cocatalyst can be added to a supported single site catalyst in situ or en route to a reactor. The single site catalyst and/or cocatalyst may be slurried or dissolved in a suitable diluent or solvent respectively and then added to the passivated support. Suitable solvents or diluents include but are not limited to hydrocarbons and mineral oil. The single site catalyst may be added to the solid passivated support, in the form of a solid, solution or slurry, followed by the addition of the cocatalyst in solid form or as a solution or slurry. The cocatalyst may be added to the solid passivated support, in the form of a solid, solution or slurry, followed by the addition of the single site catalyst in solid form or as a solution or slurry. Single site catalyst, cocatalyst, and passivated support can be mixed together in the presence or absence of a diluent(s) or a solvent(s), but use of diluent(s) or solvent(s) is preferred.

The loading of the single site catalyst on the passivated support is not specifically defined, but by way of non-limiting example, the loading of a phosphinimine catalyst on a passivated support can be from about 0.005 to 1.0, or from about 0.010 to 0.50, or from about 0.015 to 0.40, or from about 0.015 to 0.035 mmol of the phosphinimine catalyst per gram of support. In further embodiments of the invention, the loading of a phosphinimine catalyst on the passivated support may be from about 0.020 to 0.031 mmol, or from about 0.025 to 0.0305 mmol of the phosphinimine catalyst per gram of support.

In embodiments of the invention, a phosphinimine catalyst will be added to the passivated support so as to give from 0.01 to 10 wt % of Ti, or from 0.05 to 5.0 wt % of Ti, or from 0.05 to 3.0 wt % of Ti, or from 0.10 to 2.0 wt % of Ti based on the combined weight of the phosphinimine catalyst, the inert support and the cocatalyst.

The olefin polymerization catalyst may be fed to a reactor system in a number of ways. The polymerization catalyst may be fed to a reactor in dry mode using a dry catalyst feeder, examples of which are well known in the art. Alternatively, the polymerization catalyst may be fed to a reactor as a slurry in a suitable diluent. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Solvents which will not extract appreciable amounts of the single site catalyst (e.g. a phosphinimine catalyst) or the cocatalyst away from the inert support are preferred. The (olefin) polymerization catalyst components, which include at least one single site catalyst, at least one passivated support and at least one cocatalyst, may be combined offline and prior to their addition to a polymerization zone, or they may be combined en route to a polymerization zone.

The Polymerization Process

Olefin polymerization processes which are compatible with the current invention include gas phase, slurry phase and combined gas phase/slurry phase polymerization processes, with gas phase processes being preferred. Preferably, ethylene copolymerization with an alpha-olefin is carried out in the gas phase, in for example at least one fluidized bed reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000–9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,482,687; 4,543,399; 4,588,790; 5,028,670; 5,317,036; 5,352,749; 5,405,922; 5,436,304; 5,453,471; 5,462,999; 5,616,661 and 5,668,228). In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from the group consisting of $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the invention is directed toward a polymerization process involving the polymerization of one or more of the monomer(s) and comonomer(s) including ethylene alone or in combination with one or more linear or branched comonomer(s) having from 3 to 30 carbon atoms, preferably 3-12 carbon atoms, more preferably 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In an embodiment of the present invention, ethylene is copolymerized with an alpha olefin having from 3-10 carbon atoms and ethylene makes up at least 75 wt % of the total olefin feed entering the reactor.

In an embodiment of the present invention, ethylene is copolymerized with an alpha olefin having from 3-10 carbon atoms and ethylene makes up at least 85 wt % of the total olefin feed entering the reactor.

In embodiments of the present invention, ethylene is copolymerized with propylene, 1-butene, 1-hexene or 1-octene.

In an embodiment of the present invention, ethylene is copolymerized with 1-butene and ethylene makes up at least 75 weight % (i.e. wt %) of the total olefin feed entering the reactor.

In an embodiment of the present invention, ethylene is copolymerized with 1-hexene and ethylene makes up at least 75 wt % of the total olefin feed entering the reactor.

In an embodiment of the present invention, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current invention to use a polymer seed bed that has been treated with an antistatic agent or an optional scavenger. In addition, the polymer products obtained by using the catalysts and processes of the current invention may themselves be used as polymer seed bed materials.

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula:

$$R^3{}_2Al^1O(R^3Al^1O)_mAl^1R^3{}_2$$

wherein each $R^3$ is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the phosphinimine catalyst) of from about 20 to about 2000, or from about 50 to about 1000, or from about 100 to about 500. Generally the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

The scavenger can be fed to the reactor using any suitable means and may be diluted or dissolved in a suitable liquid hydrocarbon diluent or solvent respectively.

The polymerization process may be carried out in the presence of any suitable anti-static agent or agents. The use of anti-static agents in a gas-phase or a slurry phase polymerization processes is well known in the art. Antistatic agents are also recognized in the art by the term "continuity additive". Generally speaking a "continuity additive" is a substance or a mixture of substances which, when present in appropriate amounts, can reduce, prevent or mitigate at least one of fouling, sheeting, and static level of a material in polymerization reactor.

Some non-limiting examples of continuity additives are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300,436; 6,306,984; 6,391,819;

6,472,342 and 6,608,153 for examples), polysulfones, polymeric polyamines and sulfonic acids (see U.S. Pat. Nos. 6,562,924; 6,022,935 and 5,283,278 for examples). Other possible continuity additives are described in European Pat. Appl. No. 107,127, including polyoxyethylenealkylamines.

Specific examples of alkoxylated amines which may be used in the present invention are Kemamine AS-990™, ARMOSTAT 1800™, and ATMER-163™ which are available from Ciba, Akzo-Nobel or Witco Chemical Company. Other suitable continuity additives include aluminum stearate and aluminum oleate. Still other specific continuity additives are supplied commercially under the trademarks OCT-ASTAT™ and STADIS™. The continuity additive STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid.

In an embodiment of the invention, a continuity additive is added directly to the supported catalyst. The amount of continuity additive added to a catalyst will depend on a number of factors such as but not limited to the type of continuity additive and the type of polymerization catalyst (and the type of support). Accordingly the amount of continuity additive used is not specifically defined, but can be from 0 (e.g. optionally) up to 150,000 parts per million (ppm) based on the weight of the supported catalyst. Alternatively, the amount of continuity additive added to a catalyst can be from about 0.2 to 10 weight percent based on the total weight of the catalyst system. By way of non-limiting example only, from 10,000 to 30,000 ppm of a STADIS continuity additive is used when it is combined with a supported polymerization catalyst.

In another embodiment, the antistatic agent may be added directly to the reactor and separately from the polymerization catalyst. The total amount of continuity additive or additives to be present in the reactor will generally not exceed 250 or 200, or 150, or 125, or 100, or 90, or 80, or 70 or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives. The total amount of one or two or more continuity additives in the reactor will be understood to be additive and where the total amount can be described as disclosed immediately above. The continuity additive can be added directly to the reactor through a dedicated feed line, and/or added to any convenient feed stream, including the ethylene feed stream, the comonomer feed stream, the catalyst feed line, or the recycle line. If more than one continuity additive is used, each one may be added to the reactor as separate feed streams, or as any combination of separate feed streams or mixtures. The manner in which the continuity additives are added to the reactor is not important, so long as the additive(s) are well dispersed within the fluidized bed, and that their feed rates (or concentrations) are regulated in a manner to provide minimum levels of fouling and/or static. From the productivity of the catalyst it is fairly routine to determine the feed rate of the antistatic agent to the reactor based on the catalyst feed rate.

In another embodiment of the invention, the continuity additive (e.g. antistatic agent) may be added directly to the reactor and separately from the polymerization catalyst as well as added directly to the supported catalyst.

Polymer

The polymer compositions made in the present invention are most preferably copolymers of ethylene and an alpha olefin selected from 1-butene, 1-hexene and 1-octene.

In embodiments of the invention, the copolymer composition will comprise at least 75 weight % of ethylene units, or at least 80 wt % of ethylene units, or at least 85 wt % of ethylene units with the balance being an alpha-olefin unit, based on the weight of the copolymer composition.

Polymer properties such as average molecular weight (e.g. Mw, Mn and Mz), molecular weight distribution (i.e. Mw/Mn), density, melt indices (e.g. $I_2$, $I_5$, $I_{21}$, $I_{10}$), melt index or melt flow ratios (e.g. $I_{21}/I_2$, $I_{21}/I_5$), composition distribution breadth index (CDBI), TREF-profile, comonomer distribution profile, and the like as these terms are defined further below and in for example co-pending CA Application No. 2,734,167 (to the same Applicant) are not specifically defined, but by way of non-limiting example only, the polymer compositions made using the present invention, may have a density of from 0.910 g/cc to 0.93 g/cc, a melt index of from 0.5 to 10.0 g/10 min, a melt flow ratio ($I_{21}/I_2$) of from 14 to 20, a weight average molecular weight of from 60,000 to 200,000, a unimodal or bimodal TREF profile, and a CDBI of greater than 55%.

Composition Distribution Breadth Index, CDBI

The terms "homogeneous" or "homogeneously branched polymer" define homogeneously branched polyethylene which has a relatively narrow composition distribution, as indicated by a relatively high composition distribution breadth index (CDBI). That is, the comonomer is randomly distributed within a given polymer chain and substantially all of the polymer chains have same ethylene/comonomer ratio. The composition distribution of a polymer can be characterized by the short chain distribution index (SCDI) or composition distribution breadth index (CDBI). The definition of composition distribution breadth index (CDBI) can be found in U.S. Pat. No. 5,206,075 and PCT publication WO 93/03093. The CDBI is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 or in U.S. Pat. No. 4,798,081 can be employed. From the weight fraction versus composition distribution curve, the CDBI is determined by establishing the weight percentage of a copolymer sample that has a comonomer content within 50% of the median comonomer content on each side of the median.

Comonomer Distribution Profile

In an embodiment of the invention, the copolymer will have a flat comonomer distribution profile as measured using Gel-Permeation Chromatography with Fourier Transform Infra-Red detection (GPC-FTIR). In an embodiment of the invention, the copolymer will have a negative (i.e. "normal") comonomer distribution profile as measured using GPC-FTIR. In an embodiment of the invention, the copolymer will have an inverse (i.e. "reversed") or partially inverse comonomer distribution profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat". The terms "reversed comonomer distribution" and "partially reversed comonomer distribution" mean that in the GPC-FTIR data obtained for the copolymer, there is one or more higher molecular weight components having a higher comonomer incorporation than in one or more lower molecular weight segments. If the comonomer incorporation rises with molecular weight, the distribution is described as "reversed". Where the comonomer incorporation rises with increasing molecular weight and then declines, the comonomer distribution is described as "partially reversed".

EXAMPLES $M_n$, $M_w$, and $M_z$ (g/mol) were determined by high temperature Gel Permeation Chromatography with differential refractive index detection using universal calibration (e.g. ASTM-D6474-99). The molecular weight distribution (MWD) is the weight average molecular weight divided by the number average molecular weight, $M_w/M_n$.

High temperature GPC equipped with an online FTIR detector (GPC-FTIR) was used to measure the comonomer content as the function of molecular weight.

The short chain branch frequency (SCB per 1000 carbon atoms) and hence the comonomer content (in weight percent) of copolymer samples was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Melt indexes, $I_2$, $I_5$, and $I_{21}$ for the polyethylene composition were measured according to ASTM D1238 (when conducted at 190° C., using a 2.16 kg, a 5 kg and a 21 kg weight respectively).

Polyethylene composition density (g/cm³) was measured according to ASTM D792.

To determine CDBI, a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI is determined by establishing the weight percentage of a copolymer sample that has a comonomer content within 50% of the median comonomer content on each side of the median (See U.S. Pat. No. 5,376,439).

The specific temperature rising elution fractionation (TREF) method used herein was as follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

Catalyst Synthesis

Determination of Total al in MAO Solutions by Back Titration of Ethylene Diamine Tetraacetic Acid (EDTA) with $ZnSO_4$:

The amount of residual MAO in the toluene filtrates was determined by treatment of a hydrolyzed, buffered (pH 6-7) solution containing the unknown amount of Al with a known amount of EDTA followed by back-titration of the excess EDTA with a known amount of $ZnSO_4$ according to the following procedures. A) Determination of unknown Al content from MAO in filtrates: In a glovebox, an aliquot of the MAO solution (~2 mL) was carefully added to a vial containing degassed 0.25 M $H_2SO_4$ (50 mL) and cyclohexane (25 mL) with stirring. The mixture was then stirred for at least 1 hr and until the aqueous layer was clear and free of solids. An aliquot of the aqueous $H_2SO_4$ solution (containing between 0.10-0.15 mmol Al and brought to a total weight of 5 g by addition of 0.25 M $H_2SO_4$ solution) was then treated with 21 mL of a 0.01 M solution of EDTA. To the sample was added 10 mL of a neutralization buffer (prepared by dissolving 136.9 g of sodium acetate trihydrate, 45 g of sodium hydroxide pellets, and 80 mL of glacial (100%) acetic acid in deionized water and diluted to 1 L) and the resulting solution was heated to boiling and held for 5 minutes. After cooling in an ice bath, the sample was diluted with 60 mL of a 45 v/v % i-PrOH (aqueous solution in deionized water). To the sample was added a solution of dithizone indicator (freshly prepared by dissolving approximately 0.04 g diphenylthiocarbazone in approximately 15 mL of acetone) dropwise via Pasteur pipette until the solution transmittance reached approximately 55% (Brinkman PC 800 Colorimeter; transmittance set to 100% with deionized water). The residual EDTA in the sample was then titrated with 0.015 M $ZnSO_4$ solution (Metrohm Model 702 SM Titrino Titroprocessor; 0.05 mL increments; 10 mL/min; 20 mL total addition) and the amount of 1:1 EDTA:$Al^{3+}$ complex was back-calculated. B) Preparation and standardization of EDTA solution: A 0.01 M solution of EDTA was prepared by dilution of 100 mL of 0.1M EDTA solution to 1 L with deionized water. A basic solution of known [$Mg^2$] was prepared by dilution of 5.0 mL of 1000 mg/L Mg standard solution with 40 mL of deionized water and addition of 1 mL of concentrated ammonium hydroxide solution and dropwise addition of Eriochrome Black-T indicator solution (prepared by dissolving 0.2 g of Eriochrome Black-T in 5 mL of ethanol and 15 mL of triethanolamine) to adjust the transmittance (Brinkman PC 800 Colorimeter) to less than 20%. The solution was then titrated with 0.01 M EDTA solution (0.10 mL increments; 25 mL/min; endpoint colour change from pink to blue). C) Preparation and standardization of $ZnSO_4$ solution: A 0.015 M solution of $ZnSO_4$ was prepared by dissolving 4.4 g of $ZnSO_4.7H_2O$ in 1 L of deionized water. To a 10 mL aliquot of standardized EDTA solution was added 10 mL of a neutralization buffer (prepared by dissolving 136.9 g of sodium acetate trihydrate, 45 g of sodium hydroxide pellets, and 80 mL of glacial (100%) acetic acid in 1 L of deionized water), and 60 mL of a 45 v/v % i-PrOH (aqueous solution in deionized water). A solution of dithizone indicator (freshly prepared by dissolving approximately 0.04 g diphenylthiocarbazone in approximately 15 mL of acetone) was then added dropwise via Pasteur pipette until the solution transmittance reached approximately 55% (Brinkman PC 800 Colorimeter; transmittance set to 100% with deionized water). The solution was then titrated with 0.015 M $ZnSO_4$ solution (Metrohm Model 702 SM Titrino Titroprocessor; 0.10 mL increments; 25 mL/min; 20 mL total addition; endpoint colour change from brown to pink).

Inventive Catalyst 1 (Catalyst Preparation, Passivated Support):

Raw Sylopol 2408 silica (Grace Davison) was dehydrated by heating the silica under a flow of nitrogen (~0.4 slpm) from ambient temperature up to 600° C. over 8 hours (ramp rate of ~1.2° C./min), holding at 600° C. for 4 hours, and then cooling back to ambient temperature under nitrogen flow. To a slurry of the calcined silica (4.002 g) in anhydrous heptane (10 mL) was added a solution of $AlEt_3$ (TEAL) in hexane (0.982 g of 25 wt % solution, 2.2 mmol) dropwise by syringe with overhead mechanical stirring and the resulting slurry was stirred for 30 minutes. A heptane solution of butylethylmagnesium (2.782 g of 20 wt % solution, 5.0 mmol) was then added dropwise by syringe and the slurry was stirred for 2 hours. A solution of tert-butylchloride (0.942 g, 10.2 mmol) in anhydrous heptane (10 mL) was then added dropwise and the slurry was stirred for an additional 2 hours. The slurry was then filtered through a medium pore frit and the solid was then washed with pentane (2×10 mL portions) and dried under vacuum (to <400 mTorr). A toluene solution of methylaluminoxane (1.405 g of 10 wt % MAO; Albermarle) was added to a toluene slurry (2 mL) of the dried support (0.506 g) and the resulting slurry was shaken for 2 hours. The slurry was then filtered through a medium pore frit and the solid was washed with toluene (2×1 mL portions) and dried under vacuum (to <400 mTorr). The combined toluene filtrates (1.412 g) were determined to have 0.54 wt % Al from MAO which corresponded to 88 mol % of the MAO taken up by the support and 9.0 wt % Al from MAO on the final support. A toluene solution of [1,2-(n-Pr, $C_6F_5$)Cp](t-$Bu_3$PN)$TiCl_2$ (9 mg in 0.9 mL) was added to a toluene slurry (2 mL) of the dried MAO-treated support (0.506 g) and the resulting slurry was shaken for 2 hours. The slurry was then filtered through a medium pore frit and the solid was washed with toluene (3 mL), pentane (2×3 mL portions), and dried under vacuum (to <400 mTorr).

Catalyst composition data are given in Tables 1-3.

Inventive Catalysts 2 to 7 and 10 to 14 (Catalyst Preparation, Passivated Support):

Catalysts 2-7 and 10-14 were prepared according to the methods used above with variation of the identity and amounts of the organoaluminum compound and the amounts of butylethylmagnesium and tert-butylchloride. For catalysts 2-7, treatments of the supports with MAO and calculation of the resulting wt % Al from MAO on the support were also performed according to the methods provided above. For catalyst composition data, see Tables 1-3. For catalysts 10-14, the amounts of MAO were adjusted to the desired ratio and measurements of the residual Al from MAO in filtrates were not performed. The amounts of MAO used can vary. For catalyst composition data, see Tables 3.

Inventive Catalyst 8 (Catalyst Preparation, Passivated Support):

To a slurry of the calcined Sylopol 2408 silica (40.00 g) in anhydrous heptane (300 mL) was added a solution of $AlEt_3$ in hexane (7.764 g of 25 wt % solution, 17.0 mmol) dropwise by syringe with overhead mechanical stirring and the resulting slurry was stirred for 30 minutes. A heptane solution of butylethylmagnesium (26.698 g of 20 wt % solution, 48.33 mmol) was then added dropwise by syringe and the slurry was stirred for 2 hours. A solution of tert-butylchloride (8.895 g, 97.06 mmol) in anhydrous heptane (50 mL) was then added dropwise and the slurry was stirred for an additional 2 hours. The slurry was filtered through a medium pore frit and the solid was then washed with pentane (2×150 mL portions) and dried under vacuum (to <400 mTorr). A toluene solution of methylaluminoxane (65.650 g of 10 wt % MAO; Albermarle) was added to a toluene slurry (300 mL) of the dried support (46.282 g) and the resulting slurry was stirred with overhead mechanical stirring for 1 hour. A toluene solution (30 mL) of [1,2-(n-Pr, $C_6F_5$)Cp](t-$Bu_3$PN)$TiCl_2$ (0.972 g) was then added and the slurry was stirred for an additional 2 hours. The slurry was then filtered through a medium pore frit and the solid was washed with toluene (150 mL), pentane (2×150 mL) and dried under vacuum (to <400 mTorr). For catalyst composition data see Tables 1-3.

Inventive Catalyst 9 (Catalyst Preparation, Passivated Support):

To a slurry of the calcined Sylopol 2408 silica (109.6 g) in anhydrous heptane (1 L) was added a solution of $AlEt_3$ in hexane (21.29 g of 25 wt % solution, 46.62 mmol) dropwise by syringe with overhead mechanical stirring and the resulting slurry was stirred for 30 minutes. The slurry was filtered through a medium pore frit and the solid was then washed with pentane (2×150 mL portions) and dried under vacuum (to <400 mTorr). To a slurry of the $AlEt_3$-treated support (113.565 g) in anhydrous heptane (500 mL) was added a heptane solution of butylethylmagnesium (75.795 g of 20 wt % solution, 137.21 mmol) was then added dropwise by syringe and the slurry was stirred for 2 hours. A solution of tert-butylchloride (25.504 g, 275.51 mmol) in anhydrous heptane (100 mL) was then added dropwise and the slurry was stirred for an additional 2 hours. The slurry was filtered through a medium pore frit and the solid was then washed with pentane (2×400 mL portions) and dried under vacuum (to <400 mTorr). A toluene solution of methylaluminoxane (129.264 g of 10 wt % MAO; Albermarle) was added to a toluene slurry (300 mL) of the dried support (67.916 g) and the resulting slurry was stirred with overhead mechanical stirring for 1 hour. A toluene solution (50 mL) of [1,2-(n-Pr, $C_6F_5$)Cp](t-$Bu_3$PN)$TiCl_2$ (1.486 g) was then added and the slurry was stirred for an additional 2 hours. The slurry was then filtered through a medium pore frit and the solid was washed with toluene (150 mL), pentane (2×200 mL) and dried under vacuum (to <400 mTorr). Catalyst composition data are given in Tables 1-3.

Comparative Catalyst 1 (Comparative Catalyst Preparation, Non-Passivated Support, TEAL Treatment Only):

To a slurry of the calcined Sylopol 2408 silica (160.0 g) in anhydrous heptane (1 L) was added a solution of $AlEt_3$ in hexane (31.068 g of 25 wt % solution, 68.0 mmol) dropwise by syringe with overhead mechanical stirring and the resulting slurry was stirred for 30 minutes. The slurry was filtered through a medium pore frit and the solid was then washed with pentane (2×150 mL portions) and dried under vacuum (to <400 mTorr). A toluene solution of methylaluminoxane (101.81 g of 10 wt % MAO; Albermarle) was added to a toluene slurry (300 mL) of the dried support (50.00 g) and the resulting slurry was stirred with overhead mechanical stirring for 1 hour. A toluene solution (30 mL) of [1,2-(n-Pr, $C_6F_5$)Cp](t-$Bu_3$PN)$TiCl_2$ (1.172 g) was then added and the slurry was stirred for an additional 2 hours. The slurry was then filtered through a medium pore frit and the solid was washed with toluene (150 mL), pentane (2×150 mL) and dried under vacuum (to <400 mTorr). Catalyst composition data are given in Tables 1-3.

Comparative Catalyst 2 (Comparative Catalyst Preparation, Non-Passivated Support):

Calcined silica (388.2 g; Grace Davison Sylopol 2408) was slurried in 1.4 L of anhydrous toluene. A toluene solution of methylaluminoxane (1086.67 g; 10 wt % MAO; Albermarle) was added to the slurry with stirring over 20 minutes. The slurry was stirred for 1 additional hour and a toluene solution of [1,2-(n-Pr, $C_6F_5$)Cp](t-$Bu_3$PN)$TiCl_2$ (9.158 g) was added and the slurry was stirred for an additional 2 hours. The slurry was then filtered and the solid was subsequently washed with toluene (500 mL) then pentane (500 mL) with isolation by filtration after each washing step. The supported catalyst was then dried under vacuum to a constant weight and pressure of <400 mTorr. Catalyst composition data are given in Table 3.

TABLE 1

Organoaluminum (AlR$_2$X) and MgCl$_2$ Deposition—Passivation of Support

| Catalyst No. | Silica (g) | Organoaluminum Compound (AlR$_2$X) | mmol AlR$_2$X added | mmol AlR$_2$X/ g silica | mmol BuEtMg added | mmol BuEtMg/g silica | mmol tBuCl added | Amnt RAlX on support (g) | Amnt MgCl$_2$ on support (g) | Wt % RAlX on final support | Wt % MgCl$_2$ on final support |
|---|---|---|---|---|---|---|---|---|---|---|---|
| 1 | 4.002 | AlEt$_3$ (25 wt % in hexane) | 2.15 | 0.54 | 5.04 | 1.26 | 10.18 | 0.181 | 0.479 | 3.9% | 10.3% |
| 2 | 4.001 | (iBu)$_2$AlOAl(iBu)$_2$ (20 wt % in hexane) | 2.14 | 0.53 | 5.03 | 1.26 | 10.20 | 0.514 | 0.479 | 10.3% | 9.6% |
| 3 | 4.001 | Et$_2$AlOEt (25 wt % in heptane) | 2.14 | 0.53 | 5.03 | 1.26 | 10.15 | 0.214 | 0.479 | 4.6% | 10.2% |
| 4 | 8.003 | AlEt$_3$ (25 wt % in hexane) | 3.40 | 0.43 | 4.60 | 0.58 | 9.21 | 0.286 | 0.438 | 3.3% | 5.0% |
| 5 6 | 8.002 | AlEt$_3$ (25 wt % in hexane) | 3.39 | 0.42 | 9.71 | 1.21 | 19.49 | 0.285 | 0.925 | 3.1% | 10.0% |
| 7 | 8.002 | AlEt$_3$ (25 wt % in hexane) | 3.40 | 0.42 | 15.43 | 1.93 | 30.83 | 0.286 | 1.469 | 2.9% | 15.1% |
| 8 | 40.00 | AlEt$_3$ (25 wt % in hexane) | 17.00 | 0.43 | 48.33 | 1.21 | 97.06 | 2.43 | 4.602 | 3.1% | 10.0% |
| 9 | 109.6 | AlEt$_3$ (25 wt % in hexane) | 46.62 | 0.43 | 137.21 | 1.25 | 275.5 | 2.51 | 13.064 | 3.1% | 10.3% |
| Comp. 1 | 160.0 | AlEt$_3$ (25 wt % in hexane) | 68.04 | 0.43 | — | — | — | — | — | 3.5% | — |

TABLE 2

Treatment of Silica Support with MAO/Wt % of Al from MAO on the Support

| Catalyst No. | Amnt. of support used for MAO treatment (g) | Amnt. of 10% MAO solution used (g) | % MAO taken up by support | Al from MAO on final support (wt %) |
|---|---|---|---|---|
| 1 | 0.506 | 1.405 | 88% | 9.0% |
| 2 | 0.501 | 1.404 | 72% | 7.6% |
| 3 | 0.500 | 1.400 | 85% | 8.7% |
| 4 | 2.001 | 5.547 | 85% | 8.6% |
| 5 | 2.007 | 5.549 | 71% | 7.5% |
| 6 | 2.006 | 3.387 | 97% | 6.3% |
| 7 | 2.001 | 5.549 | 71% | 7.4% |
| 8 | 46.282 | 65.65 | Assumed >95% | 5.7% |
| 9 | 67.916 | 129.264 | Assumed >95% | 7.3% |
| Comp. 1 | 50.000 | 101.808 | Assumed >95% | 7.7% |

TABLE 3

Catalyst Compositions

| Catalyst No. | AlRX (wt % in catalyst) | MgCl$_2$ (wt % in catalyst) | MAO (wt % in catalyst) | Al from MAO (wt % in catalyst) | Ti (wt % in catalyst) | MAO/ Ti | Ti loading (mmol Ti/ g cat.) | Ti loading (mmol Ti/g silica) |
|---|---|---|---|---|---|---|---|---|
| 1 | 3.1 | 8.1 | 18.9 | 8.8 | 0.146 | 105 | 0.0305 | 0.021 |
| 2 | 8.4 | 7.9 | 16.1 | 7.5 | 0.146 | 91 | 0.0305 | 0.020 |
| 3 | 3.6 | 8.2 | 18.3 | 8.5 | 0.146 | 103 | 0.0305 | 0.021 |
| 4 | 2.6 | 4.0 | 18.1 | 8.4 | 0.144 | 104 | 0.0301 | 0.022 |
| 5 | 2.5 | 8.3 | 15.9 | 7.4 | 0.144 | 91 | 0.0301 | 0.022 |
| 6 | 2.6 | 8.5 | 13.3 | 6.2 | 0.144 | 76 | 0.0301 | 0.022 |
| 7 | 2.4 | 12.4 | 15.7 | 7.3 | 0.144 | 90 | 0.0301 | 0.020 |
| 8 | 2.7 | 8.6 | 12.2 | 5.7 | 0.142 | 70 | 0.0297 | 0.022 |
| 9 | 2.9 | 8.5 | 15.7 | 7.3 | 0.142 | 90 | 0.0297 | 0.021 |
| 10[1] | 2.7 | 8.6 | 12.4 | 5.8 | 0.144 | 71 | 0.0301 | 0.022 |
| 11[1] | 2.8 | 9.0 | 8.7 | 4.1 | 0.143 | 50 | 0.0299 | 0.023 |
| 12[1] | 2.9 | 9.3 | 5.3 | 2.5 | 0.144 | 30 | 0.0300 | 0.024 |
| 13[1] | 3.0 | 9.7 | 1.8 | 0.8 | 0.143 | 10 | 0.0299 | 0.025 |
| 14[2] | 3.8 | 10.1 | — | — | 0.147 | — | 0.0307 | 0.0259 |
| Comp. 1 | 2.9 | — | 16.6 | 7.7 | 0.150 | 90 | 0.0314 | 0.025 |
| Comp. 2 | — | — | 21.3 | 9.9 | 0.146 | 120 | 0.0305 | 0.023 |

Note
[1]The support from catalyst no. 5 was used to prepare these catalysts with varying amounts of MAO.

Note
[2]The support from catalyst no. 1 was used to prepare this catalyst with no added MAO.

Polymerization

Ethylene/1-Hexene Copolymerization:

Ethylene/1-hexene copolymerization experiments were carried out in a 2 L stirred autoclave bench-scale reactor in gas phase operation at 90° C. for 60 minutes at a total operating pressure of 200 psig. The data for these polymerization runs are reported in Table 4. The reactor was charged with granular, dried NaCl (160 g; pre-dried in an oven at 160° C.), heated to 100° C., purged with nitrogen (4 cycles) and ethylene (1 cycle). The reactor was cooled to 90° C. and approximately 0.6 mL of a 25% solution of triisobutylaluminum (TIBAL) in heptane was injected into the reactor. This material acted as an impurity scavenger to assist with purification of the reactor internal surfaces and the NaCl used as a seedbed. A 2 mL portion of purified 1-hexene was added to the reactor and then the reactor was pressurized to 150 psig with ethylene. The catalyst (20-30 mg) was loaded into an injection tube under anaerobic conditions in a glovebox and was then connected to the reactor process. The catalyst was injected into the reactor with 200 psig of ethylene to initiate polymerization and the reactor pressure was maintained at 200 psig with ethylene throughout the experiment. Polymerization was terminated by venting the reactor and cooling to ambient temperature. Inventive polymerizations are runs 1-14 which employ inventive catalysts 1-14, respectively. Comparative polymerizations are run 15 which employs comparative catalyst 1 and polymerization runs 16-24 which employ comparative catalyst 2.

Ethylene/1-Hexene Copolymerization with Continuous Addition of 1-Hexene and Hydrogen:

Ethylene/1-hexene copolymerization experiments were carried out in a 2 L stirred autoclave bench-scale reactor in gas phase operation at 80° C. for 60 minutes at a total operating pressure of 294 psig. The data for these polymerization runs are reported in Table 5. The data for the copolymers obtained are reported in Table 6. During reactor conditioning and set-up procedures, approximately 0.6 mL of a 25% solution of triisobutylaluminum (TIBAL) in heptane was injected into the reactor. This material acted as an impurity scavenger to assist with purification of the reactor internal surfaces and the 100 g of high density polyethylene beads used as a seedbed. Ethylene partial pressure was maintained at 60 mol % in the reactor. 1-Hexene partial pressure was maintained at 1 mol %. Hydrogen flow was adjusted to the ethylene flow such that the partial pressure was maintained at approximately 0.2 mol % and the balance of the reactor mixture (approximately 38.8 mol %) was nitrogen. The catalyst (35-40 mg) was loaded into an injection tube under anaerobic conditions in a glovebox and was then connected to the reactor process. A portion of the nitrogen used to make up the reactor gas composition was used to push the catalyst into the reactor to initiate polymerization. Polymerization was terminated by venting the reactor and cooling to ambient temperature. Inventive polymerizations are runs 25-27 which employ inventive catalysts 1-3 respectively. Comparative polymerization run 28 employs comparative catalyst 2.

TABLE 4

Ethylene/1-hexene Copolymerization[3]

| Poly. Run No. | Catalyst No. | MgCl$_2$ (wt % in catalyst) | Al from MAO (wt % in catalyst) | Productivity (g PE/g cat.) | Activity (kg PE/((mmol Ti)[C2](hr)) |
|---|---|---|---|---|---|
| 1 | 1 | 8.2 | 8.8 | 2430 | 158 |
| 2 | 2 | 7.9 | 7.5 | 3128 | 203 |
| 3 | 3 | 8.2 | 8.5 | 3451 | 374 |
| 4 | 4 | 4.0 | 8.4 | 3021 | 200 |
| 5 | 5 | 8.2 | 7.4 | 3202 | 212 |
| 6 | 6 | 8.5 | 6.2 | 2718 | 180 |
| 7 | 7 | 12.4 | 7.3 | 2643 | 175 |
| 8 | 8 | 8.6 | 5.7 | 6243 | 413 |
| 9 | 9 | 8.5 | 7.3 | 3700 | 244 |
| 10 | 10 | 8.6 | 5.8 | 6008 | 397 |
| 11 | 11 | 9.0 | 4.1 | 5538 | 366 |
| 12 | 12 | 9.3 | 2.5 | 1652 | 109 |
| 13 | 13 | 9.7 | 0.8 | 1583 | 105 |
| 14 | 14 | 10.1 | — | 46 | 3 |
| 15 | Comp. 1 | — | 7.7 | 2147 | 136 |
| 16-24 (Average of 9 runs) | Comp. 2 | — | 9.7 | 3610 ± 744 (stnd. dev.) | ~241 |

Note 3:
2 mL pre-charge of 1-hexene;
total rxn pressure (psig) was 200 psig;
rxn temperature was 90° C.

TABLE 5

Ethylene/1-hexene Copolymerization with Continuous Addition of 1-Hexene and H$_2$.[4]

| Poly. Run No. | Catalyst No. | Organoaluminum Compound (AlR$_2$X) | MgCl$_2$ (wt % in catalyst) | MAO/Ti (molar ratio) | MAO content on catalyst (wt %) | Productivity (g PE/g cat.) | Activity (kg PE/((mmol Ti)[C2](hr)) |
|---|---|---|---|---|---|---|---|
| 25 | 1 | AlEt$_3$ | 8.2 | 105 | 8.8 | 1983 | 147 |
| 26 | 2 | (iBu)$_2$AlOAl(iBu)$_2$ | 7.9 | 91 | 7.5 | 1874 | 139 |
| 27 | 3 | Et$_2$AlOEt | 8.2 | 103 | 8.5 | 1379 | 102 |
| 28 | Comp. 2 | — | — | 120 | 9.9 | 2131 | 161 |

Note
[4]continuous addition of 1-hexene at 1 mol %; continuous addition, of hydrogen at 0.2 mol %; total rxn pressure (psig) was 294 psig; rxn temperature was 80° C.; productivity is in grams of polymer per gram of polymerization catalyst

TABLE 6

Polymer Properties

| Poly. Run No. | Catalyst No. | Melt Index, $I_2$ | Flow Index, $I_{21}/I_5$ | Melt Flow Ratio, $I_{21}/I_2$ | Density (g/cc) | Bulk density (g/mL) | $M_n$ | $M_w$ | $M_w/M_n$ | wt % 1-hexene | CDBI-(50) |
|---|---|---|---|---|---|---|---|---|---|---|---|
| 25 | 1 | 0.76 | 12.9 | 17.0 | 0.9208 | 0.393 | 59996 | 115592 | 1.93 | 4.6 | 70.5 |
| 26 | 2 | 0.51 | 9.3 | 18.2 | 0.9214 | 0.374 | 57745 | 125050 | 2.17 | 4.7 | 68.7 |

TABLE 6-continued

Polymer Properties

| Poly. Run No. | Catalyst No. | Melt Index, $I_2$ | Flow Index, $I_{21}/I_5$ | Melt Flow Ratio, $I_{21}/I_2$ | Density (g/cc) | Bulk density (g/mL) | $M_n$ | $M_w$ | $M_w/M_n$ | wt % 1-hexene | CDBI-(50) |
|---|---|---|---|---|---|---|---|---|---|---|---|
| 27 | 3 | 0.54 | 9.5 | 17.5 | 0.9238 | 0.354 | 57574 | 124200 | 2.16 | 4.4 | 73.8 |
| 28 | Comp. 2 | 0.95 | 16.5 | 17.3 | 0.9200 | 0.389 | 54489 | 107405 | 1.97 | 5.4 | 58.9 |

Tables 4 and 5, show that inventive catalysts 1-11 (which involve immobilization of a single site catalyst on a passivated support) have activities and productivities which are comparable to or higher than comparative catalysts 1 and 2 (which involve immobilization of a single site catalyst on a non-passivated support) even when a lower amount of MAO cocatalyst was employed for the inventive catalysts compositions. In fact, several of the inventive catalysts in Table 4 show even better catalyst activity than catalysts prepared from a non-passivated support: compare for example, polymerization runs nos 8-11 (inventive) with polymerization run numbers 15-24 (comparative). However, in the absence of cocatalyst, as in catalyst 14, almost no polymerization activity was observed.

A person skilled in the art will recognize from the data provided in Table 6, that the ethylene/1-hexene copolymers obtained using a phosphinimine single site catalyst immobilized on a passivated support have similar or higher CDBIs as an ethylene/1-hexene copolymer obtained using a single site catalyst immobilized on a traditional (i.e. non-passivated) support. All the copolymers are produced under similar polymerization conditions. There is also a small increase in the weight average molecular weight, $M_w$, when a passivated support is employed relative to a non-passivated support: compare inventive polymerization run nos 25-27 with comparative polymerization run no. 28 in Table 6. In addition, all the copolymers made with the inventive catalysts 1-3 have very narrow molecular weight distributions (e.g. $M_w/M_N$ of 2.17 or below), which is consistent with single site catalyst behavior.

Importantly, and as hinted at above, the data in Tables 4 and 5 demonstrates that when using a passivated support, reduced amounts of methylaluminoxane (MAO) co-catalyst can be employed, relative to catalysts immobilized on a non-passivated support, and without a large decrease in catalyst productivity (compare inventive polymerization run nos 1-11 with comparative polymerization run nos 15-24 in Table 4; also compare inventive polymerization runs 25-27 with comparative polymerization run 28, in Table 5).

FIG. 1 included herein, also shows that the molar ratio of MAO (or Al from MAO) to the group 4 metal (e.g. titanium in the case of the present example), MAO:Ti, can be reduced when using inventive catalysts 1-11 without significantly reducing the overall productivity of the catalyst. For example, for a molar ratio of MAO:Ti of from about 105:1 all the way down to about 50:1, the productivity remains high at over 2000 g polymer/g of polymerization catalyst. Reduction of the MAO:Ti ratio further to 30:1 and 10:1 as in inventive catalysts 12 and 13, respectively, results in catalyst formulations that still have significant activity at greater than 1500 g polymer/g polymerization. We also note that a catalyst formulation employing a passivated support must contain some amount of an activator such as methylaluminoxane to have acceptable productivity, as shown by the near zero activity for inventive catalyst 14 employing a passivated support, but having no activator present (see the data point in FIG. 1 where the MAO:Ti ratio is zero). The trend just discussed for the inventive catalysts, is not observed for a catalyst formulation not involving support passivation by treatment with an organoaluminum compound and in-situ generated $MgCl_2$. The data for comparative Catalyst 1, as well as several similarly prepared catalysts having different Al (from MAO) to Ti (from the single site catalyst) molar ratios are included in FIG. 1 (open triangles). In the absence of $MgCl_2$ passivation, the productivity of the catalyst declines rapidly at lower MAO/Ti ratios. For example at a molar ratio of MAO:Ti of around 75, the productivity drops to below 1000 g PE/g of catalyst, whereas at a molar ratio of MAO:Ti of about 120:1 the productivity is above 2500 g PE/g of supported catalyst.

Since, co-catalyst components such as methylaluminoxane, are often the most expensive component of a catalyst formulation, methods which allow for their reduced use are advantageous.

Polymerization Run Numbers 29-32 (Continuous Ethylene/1-Hexene Copolymerization):

Continuous ethylene/1-hexene gas phase copolymerization experiments were conducted in a 56.4 L Technical Scale Reactor (TSR) in continuous gas phase operation. Ethylene polymerizations were run at 80° C.-90° C. with a total operating pressure of 300 pounds per square inch gauge (psig). Gas phase compositions for ethylene and 1-hexene were controlled via closed-loop process control to values of 50.0 and 0.5-1.5 mole %, respectively. Hydrogen was metered into the reactor in a molar feed ratio of 0.0002-0.0003 relative to ethylene feed during polymerization. Nitrogen constituted the remainder of the gas phase mixture (approximately 49 mole %). Typical production rate for these conditions is 2.0 to 3.0 kg of polyethylene per hour.

The catalyst metering device used for administering catalyst to the reactor is equipped with a probe that measures electrostatic charge carried by the solid material passing through a monitored tube leading catalyst to the reactor.

Continuous polymerization results and conditions are shown in Table 7. Polymer properties are shown in Table 8. Inventive polymerizations are runs 29 and 32 which employ inventive catalysts 8 and 9 respectively. Comparative polymerization runs 30 and 31 employ comparative catalyst 1 and 2 respectively.

TABLE 7

Ethylene/1-Hexene Copolymerization in Continuous Reactor

| Poly. Run No. | Catalyst No. | Reactor temp. (° C.) | C6/C2 molar ratio | H2/C2 molar ratio | Productivity (gPE/g cat.) | Bulk Density (lb/ft³) | Avg particle size (mm) | Melt index, $I_2$ | Density |
|---|---|---|---|---|---|---|---|---|---|
| 29 | 8 | 80 | 0.0180 | 0.00035 | 4300 | 29.2 | 0.616 | 1.09 | 0.919 |
| 30 | Comp. 1 | 80 | 0.0193 | 0.00029 | 3350 | 29.0 | 0.476 | 0.95 | 0.918 |

TABLE 7-continued

Ethylene/1-Hexene Copolymerization in Continuous Reactor

| Poly. Run No. | Catalyst No. | Reactor temp. (° C.) | C6/C2 molar ratio | H2/C2 molar ratio | Productivity (gPE/g cat.) | Bulk Density (lb/ft$^3$) | Avg particle size (mm) | Melt index, $I_2$ | Density |
|---|---|---|---|---|---|---|---|---|---|
| 31 | Comp. 2 | 80 | 0.0201 | 0.00028 | 2616 | 25.0 | 0.601 | 0.86 | 0.918 |
| 32 | 9 | 85 | 0.0215 | 0.00029 | 5300 | not determined | not determined | 0.70 | 0.914 |

TABLE 8

Polymer Properties

| Poly. Run No. | Catalyst | $M_n$ | $M_w$ | $M_w/M_n$ | wt % 1-C6 | CDBI (hexene$_{50}$) | GPC-FTIR Comonomer Distribution Profile |
|---|---|---|---|---|---|---|---|
| 29 | 8 | 47347 | 95002 | 2.01 | 5.2 | 57.3 | Flat |
| 30 | Comp. 1 | 57028 | 105252 | 1.85 | 5.6 | 56.6 | Negative |
| 31 | Comp. 2 | 49289 | 108919 | 2.21 | 6.2 | 59.8 | Flat |

The data in Table 7 show that, for a given temperature (80° C.), use of a passivated support provides a catalyst system which is less sensitive to hydrogen relative to a catalyst not formulated with a passivated support. Compare polymerization run number 29 with run numbers 30 and 31. All three target a melt index, $I_2$ of approximately 1, but use of the inventive catalyst formulation, catalyst 8, requires more hydrogen (the H2/C2 molar ratio is 0.00035) to reach the target melt index than do comparative catalysts 1 and 2 (the H2/C2 molar ratio is 0.00029 and 0.00028 respectively). A decrease in hydrogen sensitivity may be considered advantageous for polymerization process control.

In contrast, a slight increase in comonomer sensitivity is indicated by the data provided in Table 7 (at a temperature of 80° C.). That is, when using inventive catalyst 8, the amount of 1-hexene required to reach a certain density (e.g. ca. 0.918 g/cc) is somewhat lower relative to the amount required when using comparative catalysts 1 or 2: compare poly. run no. 29 which requires a C6/C2 molar ratio of 0.018 to poly. run nos 30 and 31 which require a C6/C2 molar ratio of 0.0913 and 0.0201 respectively. A decrease in the amount of comonomer being fed to a reactor to generate a polymer with a given density may be advantageous from an economic viewpoint.

The data further demonstrates that use of a passivated support provides for catalysts having increased productivity. Compare polymerization run numbers 29 and 32, employing inventive catalysts 8 and 9 which show productivities of 4300 and 5300 g PE/g catalyst respectively, with polymerization run numbers 30 and 31, employing comparative catalysts 1 and 2 which show productivities of 3350 and 2616 g PE/g catalyst respectively.

Also significant, is that the bulk density of the polymer made with catalysts formulated with a passivated support is higher than the bulk density of the polymer made with catalysts formulated with a completely un-treated support. Compare the bulk density of the polymer obtained in poly. run no. 29 (using inventive catalyst 8) which is 29.2 lb/ft$^3$ with the bulk density of the polymer obtained in poly. run no. 31 (using comp. catalyst 2), which is 25.0 lb/ft$^3$. An increase in the bulk density of the polymer being formed, may allow for an increase in the polymer production rate per unit of reactor volume.

Figure 2A:
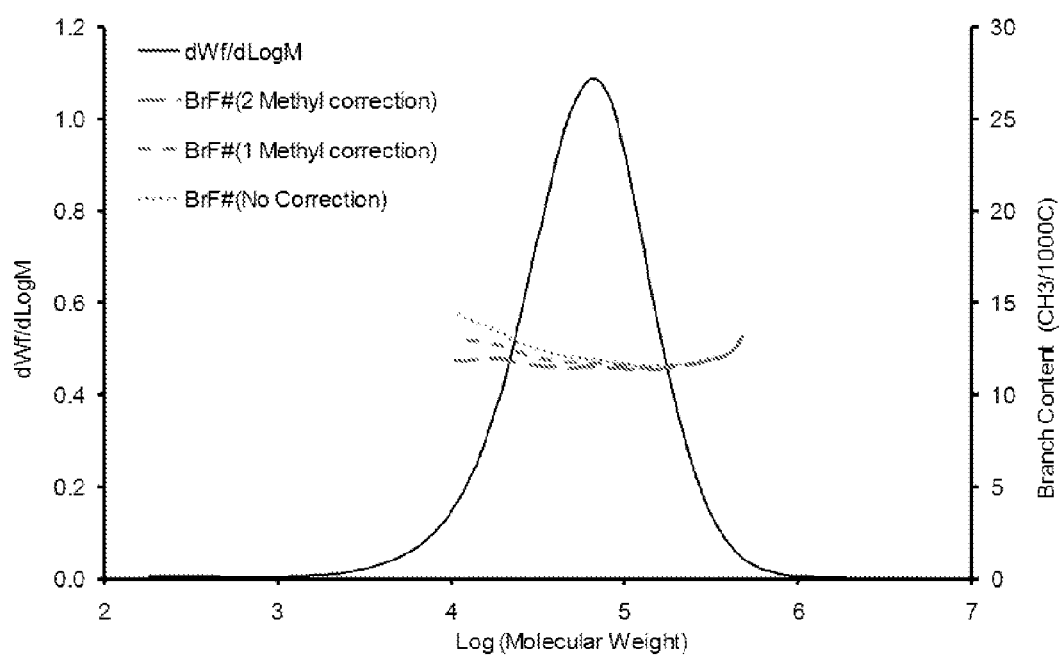
FIG. 2 shows the gel-permeation chromatograph coupled with Fourier transform analysis for polymers made with inventive and comparative catalyst compositions. A) Inventive Catalyst 8: A phosphinimine catalyst and methylaluminoxane supported on a $MgCl_2$/TEAL treated silica support; the MAO:Ti molar ratio is 70:1. B) Comparative Catalyst 1: A phosphinimine catalyst and methylaluminoxane supported on a TEAL treated silica support; the MAO:Ti molar ratio is 90:1. C) Comparative Catalyst 2: A phosphinimine catalyst and methylaluminoxane supported on a silica support; the MAO:Ti molar ratio is 120:1.
Figure 2B:
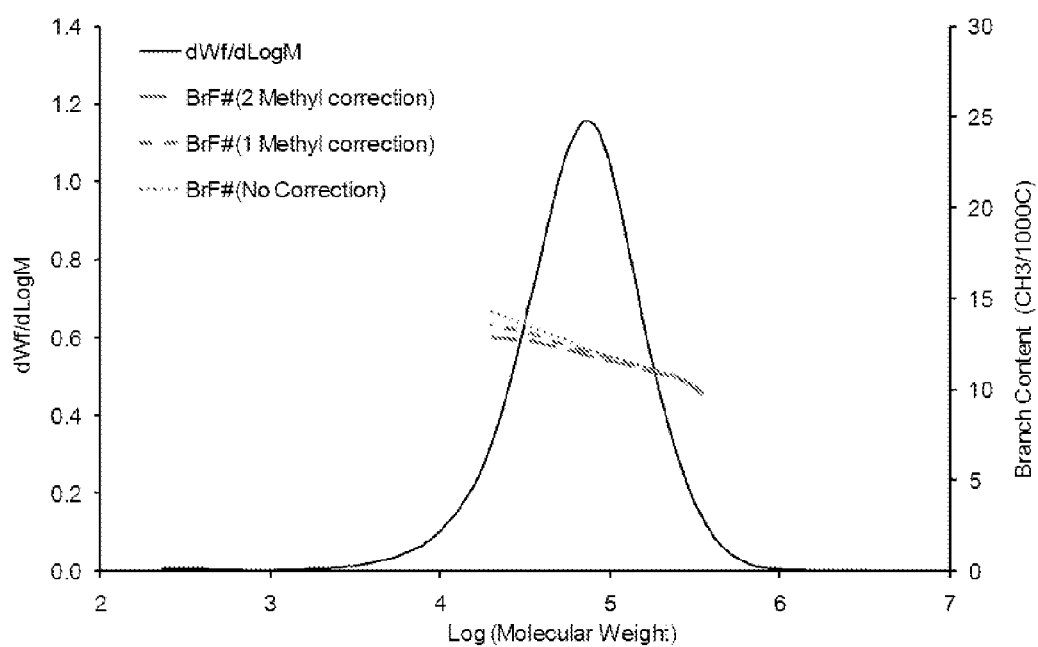
Figure 2C:
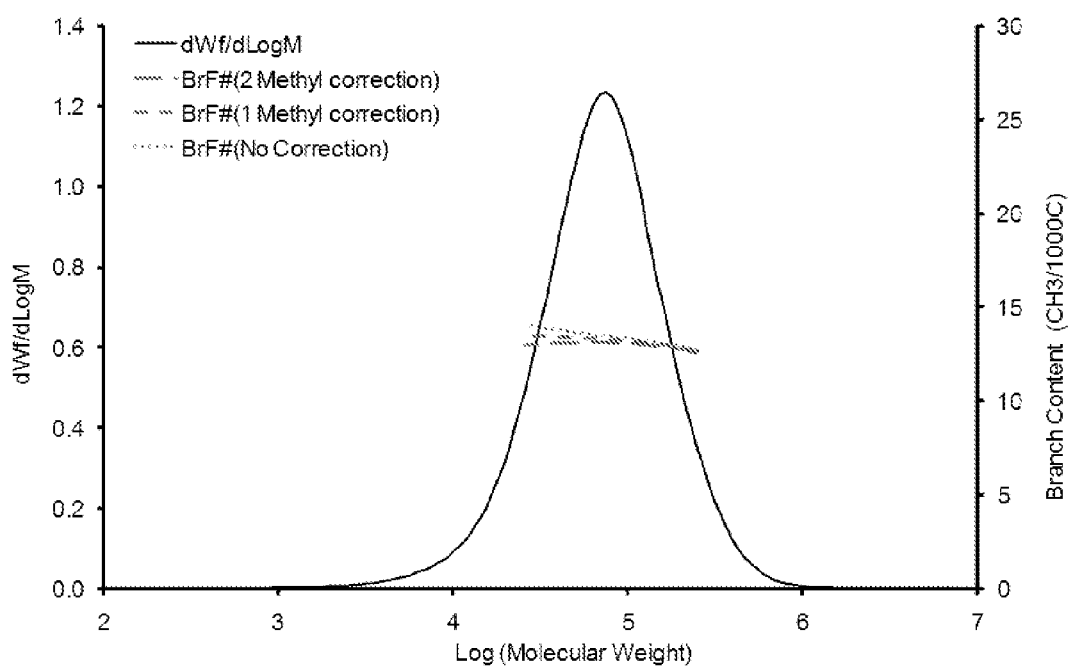

Finally, the use of a passivated support with a polymerization catalyst appears not to negatively impact the comonomer distribution of an ethylene copolymer made using the catalyst. The data in Table 8 and that provided by FIGS. 2a, 2b and 2c, show that inventive catalyst 8 has an approximately flat comonomer distribution, similar to comparative catalyst 2, but less negative than the comonomer distribution observed when employing comparative catalyst 1.

What is claimed is:

1. An olefin polymerization catalyst comprising: a passivated support, a group 4 single site catalyst and a cocatalyst, the passivated support comprising silica which has been treated with i) an organoaluminum compound and ii) magnesium chloride, wherein the magnesium chloride is generated by addition of a diorganomagnesium compound and a source of chloride to the organoaluminum treated silica, provided that the source of chloride is not a transition metal chloride and wherein said passivated support is prepared in a non-polar hydrocarbon solvent or diluent.

2. The olefin polymerization catalyst of claim 1 wherein said group 4 single site catalyst is a phosphinimine catalyst.

3. The olefin polymerization catalyst of claim 1 wherein magnesium chloride comprises from 3 to 15 weight percent of the catalyst.

4. The olefin polymerization catalyst of claim 1 wherein the organoaluminum compound is added to silica in an amount to give from 0.1 to 3.5 mmol of aluminum per gram of silica.

5. The olefin polymerization catalyst of claim 1 wherein the diorganomagnesium compound is added to silica in an amount to give from 0.1 to 3.5 mmol of magnesium per gram of silica.

6. The olefin polymerization catalyst of claim 1 wherein the molar ratio of chloride in the source of chloride to the diorganomagnesium compound is from 1.85 to 2.5.

7. The olefin polymerization catalyst of claim 1 wherein the source of chloride is an alkyl chloride.

8. The olefin polymerization catalyst of claim 1 wherein the diorganomagnesium compound is a dialkyl magnesium compound.

9. The olefin polymerization catalyst of claim 1 wherein the organoaluminum compound is selected from the group consisting of trimethylaluminum, triisobutylaluminum, triethylaluminum, tri-n-hexylaluminum, tri-n-octylaluminum, diethylaluminum ethoxide, and bis(di-isobutylaluminum)oxide and mixtures thereof.

10. The olefin polymerization catalyst of claim 2 wherein the cocatalyst is an alkylaluminoxane.

11. The olefin polymerization catalyst of claim 10 wherein the molar ratio of aluminum from the alkylaluminoxane to group 4 metal from the phosphinimine catalyst is less than 100:1.

12. The olefin polymerization catalyst of claim 10 wherein the molar ratio of aluminum from the alkylaluminoxane to group 4 metal from the phosphinimine catalyst is from 10:1 to 100:1.

13. The olefin polymerization catalyst of claim 2 wherein the phosphinimine catalyst has the formula: $(1,2\text{-}(R^2)(Ar\text{-}F)Cp)Ti(N=P(t\text{-}Bu)_3)X_2$, where $R^2$ is a hydrocarbon group, Ar—F is a perfluorinated aryl group, a 2,6 fluoro substituted phenyl group, a 2,4,6 fluoro substituted phenyl, or a 2,3,5,6 fluoro substituted phenyl group, and X is an activatable ligand.

* * * * *